(12) United States Patent
Wolfgang et al.

(10) Patent No.: US 10,377,061 B2
(45) Date of Patent: Aug. 13, 2019

(54) PROCESSING OF THREE DIMENSIONAL PRINTED PARTS

(71) Applicant: SHAPEWAYS, INC., New York, NY (US)

(72) Inventors: Justin Wolfgang, Brooklyn, NY (US); Zoe Kathleen Logan, Brooklyn, NY (US); Charles Lord, Brooklyn, NY (US); Raheel Valiani, New York, NY (US); Hugo Ploegmakers, Eindhoven (NL)

(73) Assignee: Shapeways, Inc., New York, NY (US)

( * ) Notice: Subject to any disclaimer, the term of this patent is extended or adjusted under 35 U.S.C. 154(b) by 312 days.

(21) Appl. No.: 14/220,957

(22) Filed: Mar. 20, 2014

(65) Prior Publication Data

US 2015/0266211 A1    Sep. 24, 2015

(51) Int. Cl.
 *B29C 37/00* (2006.01)
 *B33Y 40/00* (2015.01)
 (Continued)

(52) U.S. Cl.
 CPC .......... *B29C 37/0003* (2013.01); *B29C 64/35* (2017.08); *B33Y 40/00* (2014.12);
 (Continued)

(58) Field of Classification Search
 CPC . B29C 67/0077; B29C 67/0096; B29C 64/35; B29C 64/357; B29C 64/386;
 (Continued)

(56) References Cited

U.S. PATENT DOCUMENTS 2,072,725 A    3/1937    Louis
3,336,701 A *  8/1967    Moore ................. B24B 31/062
                                                         366/128
(Continued)

FOREIGN PATENT DOCUMENTS

DE         29506716 U1    6/1995
DE   102011002954 A1 *   7/2012   ............... B07B 1/22
(Continued)

OTHER PUBLICATIONS

DE102011002954 (A1) Machine Translation from German to English of the Specification.*
(Continued)

*Primary Examiner* — Joseph S Del Sole
*Assistant Examiner* — Lawrence D. Hohenbrink, Jr.
(74) *Attorney, Agent, or Firm* — Wolf, Greenfield & Sacks, P.C.

(57) ABSTRACT

A system for post-print processing of 3D printed parts includes an automated breakout system for separating 3D printed parts from printing media in a tray and a vibratory media cleaning system for removing printing media from the 3D printed parts. The automated breakout system includes a tray input mechanism, a bed including a first end disposed adjacent the tray input mechanism, the bed including one or more passageways configured to pass printing media through the bed, a vibration generator coupled to the bed and configured to vibrate the bed, and a part terminator disposed adjacent a second end of the bed. The vibratory media cleaning system include a vibratory bin, a vibration generator coupled to the vibratory bin and configured to vibrate the vibratory bin, an automated parts loader configured to introduce 3D printed parts to be cleaned into the bin, and an automated parts removal mechanism.

22 Claims, 16 Drawing Sheets

(51) Int. Cl.
| | |
|---|---|
| *B29C 64/35* | (2017.01) |
| *B33Y 10/00* | (2015.01) |
| *B33Y 30/00* | (2015.01) |
| *B33Y 50/02* | (2015.01) |
| *B29C 64/393* | (2017.01) |
| *B29C 37/02* | (2006.01) |
| *B07B 1/04* | (2006.01) |
| *B07B 1/46* | (2006.01) |
| *B33Y 50/00* | (2015.01) |
| *B29C 64/357* | (2017.01) |
| *B07B 1/42* | (2006.01) |
| *B07B 13/16* | (2006.01) |
| *B07B 13/07* | (2006.01) |
| *B08B 7/02* | (2006.01) |
| *B29C 64/386* | (2017.01) |
| *B07B 13/18* | (2006.01) |
| *B07B 1/40* | (2006.01) |
| *B07B 13/11* | (2006.01) |
| *B07B 1/28* | (2006.01) |

(52) U.S. Cl.
CPC . *B07B 1/04* (2013.01); *B07B 1/28* (2013.01); *B07B 1/40* (2013.01); *B07B 1/42* (2013.01); *B07B 1/469* (2013.01); *B07B 13/07* (2013.01); *B07B 13/113* (2013.01); *B07B 13/16* (2013.01); *B07B 13/18* (2013.01); *B08B 7/02* (2013.01); *B29C 37/02* (2013.01); *B29C 64/357* (2017.08); *B29C 64/386* (2017.08); *B29C 64/393* (2017.08); *B33Y 10/00* (2014.12); *B33Y 30/00* (2014.12); *B33Y 50/00* (2014.12); *B33Y 50/02* (2014.12)

(58) Field of Classification Search
CPC ....... B29C 64/393; B29C 37/02; B33Y 10/00; B33Y 30/00; B33Y 40/00; B33Y 50/00; B33Y 50/02; B07B 1/04; B07B 1/40; B07B 13/07; B07B 1/42; B07B 1/469; B07B 13/16; B07B 13/18; B07B 13/113; B07B 1/28; B08B 7/02
USPC ................... 264/69; 425/424, 456; 209/241
See application file for complete search history.

(56) References Cited

U.S. PATENT DOCUMENTS

| | | | |
|---|---|---|---|
| 3,694,968 A | 10/1972 | Isaacson et al. | |
| 3,955,326 A | 5/1976 | Smith | |
| 3,991,524 A | 11/1976 | Ferrara | |
| 4,254,586 A | 3/1981 | Anderson et al. | |
| 4,408,417 A | 10/1983 | Kobayashi et al. | |
| 4,425,144 A * | 1/1984 | Casperson | B01D 46/30 210/272 |
| 4,680,898 A | 7/1987 | Carpenter, Jr. | |
| 4,731,959 A | 3/1988 | Musschoot | |
| RE33,542 E | 2/1991 | Musschoot | |
| 5,109,633 A | 5/1992 | Durnil | |
| 5,163,253 A | 11/1992 | Carpenter, Jr. | |
| 5,476,415 A | 12/1995 | Nishimura et al. | |
| 5,536,203 A | 7/1996 | Takeyoshi et al. | |
| 5,738,817 A | 4/1998 | Danforth et al. | |
| 6,283,839 B1 | 9/2001 | Frederick et al. | |
| 7,938,272 B2 * | 5/2011 | Antila | B07B 1/005 209/243 |
| 2006/0266284 A1 * | 11/2006 | Fritz | B07B 1/28 118/308 |
| 2013/0017767 A1 | 1/2013 | Suzuki et al. | |
| 2013/0052291 A1 * | 2/2013 | Morikawa | B29C 67/0077 425/135 |
| 2013/0310965 A1 * | 11/2013 | Schouwenburg | G06F 17/50 700/119 |
| 2015/0266157 A1 | 9/2015 | Summers et al. | |
| 2015/0266158 A1 | 9/2015 | Summers et al. | |

FOREIGN PATENT DOCUMENTS

| | | |
|---|---|---|
| GB | 1173423 A | 12/1969 |
| WO | 2007039450 A1 | 4/2007 |

OTHER PUBLICATIONS

Notification of the Transmittal of the International Search Report and the Written Opinion of the International Searching Authority from corresponding International Application No. PCT/US2015/021190 dated Oct. 15, 2015.

International Search Report and Written Opinion for International Application No. PCT/US2015/021190 dated Oct. 15, 2015.

Annex to Form PCT/ISA/206—Communication Relating to the Results of the Partial International Search from corresponding PCT Application No. PCT/US2015/021190 dated Aug. 6, 2015.

International Preliminary Report on Patentability of International Application No. PCT/US2015/021190 dated Sep. 29, 2016.

* cited by examiner

PROCESSING OF THREE DIMENSIONAL PRINTED PARTS

BACKGROUND

1. Field of the Disclosure

The present disclosure relates generally to three dimensional (3D) printing and processing of 3D printed parts. More specifically, embodiments of this disclosure relate to methods and systems for post-fabrication separation and cleaning of 3D printed parts.

2. Description of Background

There exist methods for printing objects or models (referred to herein as "3D printed parts," "3D parts" or simply "parts") in three dimensions. There are printers that are capable of taking a 3D model as an input and building an actual physical representation of that model using a variety of materials. 3D printers utilizing a selective laser sintering (SLS) process are available from companies such as 3D Systems, Inc. and EOS GmbH Electro Optical Systems, among others. SLS 3D printing generally involves creating a 3D object by laying down successive layers of material and selectively sintering portions of each successive layer with a laser to build the object layer by layer. 3D printing has become a useful method for rapid prototyping of models, across many technical disciplines. Because 3D models can be printed quickly and cheaply as compared to other techniques, 3D printing has quickly gained popularity.

A 3D model from which a 3D part is printed may be any 3D-printable digital model such as a computer-aided design (CAD) model. On-demand 3D printing of custom 3D models has become possible in recent years. For example, there are online services that offer custom 3D printing services. For instance, the online provider Shapeways (www.shapeways.com) provides custom 3D printing services wherein customers may upload custom 3D models, select materials and order 3D printed parts to be built from the selected materials.

SUMMARY

Aspects and embodiments disclosed herein include improved systems and methods for post-print processing of 3D printed parts. Some aspects and embodiments disclosed herein are directed to systems and methods for removing loosely adhered printing media powder from the surfaces of 3D printed parts printed in a SLS 3D printer. An automatic breakout system for removing loosely adhered printing media powder from the surfaces of 3D printed parts printed in a SLS 3D printer may include a tray input mechanism for receiving a tray of 3D printed parts embedded in a volume of unprocessed printing media from a SLS 3D printer. The tray input may transfer 3D printed parts and unprocessed printing media from the tray input onto a vibratory bed. Vibration of the vibratory bed may separate unprocessed printing media from the 3D printed parts. The vibratory bed may include passageways through which unprocessed printing media may fall upon the application of vibrational energy to the vibratory bed. The 3D printed parts may be directed across the vibratory bed to a part terminator.

Additional printing media may be removed from 3D printed parts in a vibratory media cleaning system. Embodiments of a vibratory media cleaning system may include a bin at least partially filled with a vibratory media. 3D printed parts may be introduced into the vibratory bin for cleaning. Vibrational energy applied to the vibratory bin may cause the vibratory media to impact or vibrate against the 3D printed parts, dislodging additional unprocessed printing media from surfaces and/or internal volumes of the 3D printed parts.

In accordance with an aspect of the present disclosure, there is provided an automated breakout system for separating 3D printed parts from printing media in a tray. The automated breakout system comprises a tray input mechanism, a bed including a first end disposed adjacent the tray input mechanism, the bed including one or more passageways configured to pass printing media through the bed, a vibration generator coupled to the bed and configured to vibrate the bed, and a part terminator disposed adjacent a second end of the bed.

In some embodiments, the bed is downwardly sloped from the first end to the second end.

In some embodiments, the one or more passageways include perforations passing through the bed.

In some embodiments, the automated breakout system further comprises a printing media powder collection bin. The automated breakout system may further comprise a recyclable printing media powder collection bin and a waste printing media powder collection bin. In some embodiments, the automated breakout system further comprises a first chute configured to direct printing media passing through a portion of the bed proximate the first end into the recyclable printing media powder collection bin and a second chute configured to direct printing media passing through a portion of the bed proximate the second end into the waste printing media powder collection bin.

In some embodiments, the part terminator comprises a conveyor.

In some embodiments, the automated breakout system further comprises sidewalls disposed along sides of the bed. A width of the bed may vary along a length of the bed from the first end to the second end.

In some embodiments, the bed comprises channels defined in an upper surface of the bed, the channels configured and arranged to direct printing media into the one or more passageways.

In some embodiments, the bed comprises impelling devices configured to move the 3D printed parts along a length of the bed from the first end to the second end.

In some embodiments, the bed is substantially horizontal.

In some embodiments, the tray input mechanism includes a tray elevator.

In some embodiments, the automated breakout system further comprises at least one monitor configured to provide data related to movement of the 3D printed parts along the bed to a control computer. The control computer may be configured to perform analysis of the data provided from the at least one monitor and to control operation of the automated breakout system responsive to the analysis.

In some embodiments, the automated breakout system further comprises at least one weight sensor configured to provide data to a control computer regarding a weight of at least one of a tray in the tray input mechanism, the printing media powder collection bin, and the part terminator.

In accordance with another aspect, there is provided a method of separating 3D printed parts from printing media in a tray. The method comprises loading the tray into a tray input mechanism of an automated breakout system, unloading the 3D printed parts and the printing media from the tray and on to a first end of a bed of the automated breakout system, vibrating the bed of the automated breakout system with one or more vibration generators, passing the printing media through passageways defined in the bed, passing the 3D printed parts along a surface of the bed of the automated breakout system from the first end to a second end of the bed, and collecting the 3D printed parts at a parts terminator adjacent the second end of the bed of the automated breakout system.

In some embodiments, the method further comprises collecting printing media passed through the passageways and re-using the collected printing media in a 3D printer to fabricate a 3D printed part.

In some embodiments, the method further comprises monitoring movement of the 3D printed parts along the bed with at least one sensor and providing data related to the movement of 3D printed parts to a control computer.

In some embodiments, the method further comprises controlling operation of the automated breakout system with the control computer responsive to analysis of the data related to the movement of 3D printed parts by the control computer.

In accordance with another aspect, there is provided a vibratory media cleaning system for removing printing media from 3D printed parts. The vibratory media cleaning system comprises a vibratory bin including vibratory media, a vibration generator coupled to the vibratory bin and configured to vibrate the vibratory bin, an automated parts loader configured to introduce 3D printed parts to be cleaned into the bin, and an automated parts removal mechanism.

In some embodiments, the vibratory media cleaning system further comprises a vibratory media recirculation feature configured to recirculate the vibratory media in the vibratory bin and to mix the 3D printed parts and vibratory media. The vibratory bin may include a curved floor which facilitates recirculation of the vibratory media in the vibratory bin.

In some embodiments, the vibratory media cleaning system further comprises a powder removal mechanism configured to collect printing media released into air above the vibratory bin.

In some embodiments, the vibratory bin is configured to tip to move the vibratory media and 3D printed parts from the vibratory bin to the automated parts removal mechanism. A wall of the vibratory bin may be configured to open to facilitate movement of the vibratory media and 3D printed parts from the vibratory bin to the automated parts removal mechanism.

In some embodiments, the vibratory bin includes a first end, a second end, and a floor which slopes downward from the first end to the second end. Vibration of the vibratory bin by the vibration generator may cause the 3D printed parts to move from the first end of the bin to the second end of the bin. The vibratory media cleaning system may further comprise an output at the second end of the vibratory bin configured to direct 3D printed parts on to the automated parts removal mechanism.

In some embodiments, the automated parts removal mechanism includes a conveyor. The conveyor may move 3D printed parts to a hopper configured to separate the 3D printed parts from the vibratory media and to return the vibratory media to the vibratory bin.

In some embodiments, the vibratory media cleaning system further comprises a vibratory media recycling system configured to separate vibratory media from 3D printed parts removed from the vibratory bin and return the separated vibratory media to the vibratory bin. The vibratory media recycling system may be further configured to separate printing media from the separated vibratory media prior to returning the separated vibratory media to the vibratory bin.

In accordance with another aspect, there is provided a method of removing printing media from 3D printed parts. The method comprises introducing a vibratory media into a vibratory bin of a vibratory media cleaning system, introducing the 3D printed parts into the vibratory bin of the vibratory media cleaning system through an automated parts loader, vibrating the vibratory bin, and removing the 3D printed parts from the vibratory bin with an automated parts removal mechanism.

In some embodiments, the method may further comprise recirculating vibratory media in the vibratory bin, recirculating of the vibratory media mixing the 3D printed parts and vibratory media.

In some embodiments, the method may further comprise automatically moving the 3D printed parts from a first end of the vibratory bin proximate the automated parts loader to a second end of the vibratory bin opposite the first end. The method may further comprise automatically removing the 3D printed parts from the second end of the vibratory bin.

In some embodiments, the method may further comprise automatically separating vibratory media from 3D printed parts removed from the vibratory bin. The method may further comprise recycling vibratory media separated from the 3D printed parts removed from the vibratory bin back to the vibratory bin. The method may further comprise automatically separating printing media from the vibratory media separated from the 3D printed parts removed from the vibratory bin prior to recycling the vibratory media back to the vibratory bin.

In accordance with another aspect, there is provided a processing system for post-print processing of 3D printed parts. The system comprises an automated breakout system for separating 3D printed parts from printing media in a tray. The automated breakout system includes a tray input mechanism, a bed including a first end disposed adjacent the tray input mechanism, the bed including one or more passageways configured to pass printing media through the bed, a vibration generator coupled to the bed and configured to vibrate the bed, and a part terminator disposed adjacent a second end of the bed. The system further comprises a vibratory media cleaning system for removing printing media from the 3D printed parts. The vibratory media cleaning system includes a vibratory bin, a vibration generator coupled to the vibratory bin and configured to vibrate the vibratory bin, an automated parts loader configured to introduce 3D printed parts to be cleaned into the bin, and an automated parts removal mechanism.

In some embodiments, the automated breakout system and the vibratory media cleaning system are operatively connected with a conveyor configured to transport 3D printed parts from the automated breakout system to the vibratory media cleaning system.

In some embodiments, the system further comprises a hopper configured to separate 3D printed parts removed from the vibratory media cleaning system from vibratory media and to return the vibratory media to the vibratory bin. The hopper may be operatively connected to an output of the vibratory media cleaning system by a conveyor configured to transport 3D printed parts from the vibratory media cleaning system to the hopper.

In some embodiments, the system further comprises a vibratory grading machine configured to remove printing media from vibratory media separated from 3D parts in the hopper. The vibratory grading machine may be operatively connected to the hopper by a conveyor configured to transport vibratory media from the hopper to the vibratory grading machine. The vibratory grading machine may be operatively connected to the vibratory media cleaning system by a conveyor configured to transport vibratory media from the vibratory grading machine to the vibratory media cleaning system.

In some embodiments, the system further comprises a final clean apparatus configured to perform a final clean of 3D printed parts removed from the hopper. The final clean apparatus may include a screen and a powder collection bin disposed below the screen. The final clean apparatus may be operatively connected to the hopper by a conveyor configured to transport 3D printed parts from the hopper to the final clean apparatus.

In some embodiments, the system further comprises a control system including one or more sensors configured to monitor transport of 3D printed parts through the processing system and a control computer in communication with the one or more sensors and configured to control operation of the system responsive to data received from the one or more sensors. The one or more sensors may be configured to monitor transport of 3D printed parts along a conveyor of the processing system.

In accordance with another aspect, there is provided a method for post-print processing of 3D printed parts. The method comprises introducing a tray including 3D printed parts and unprocessed printing media into an automated breakout system. The automated breakout system includes a tray input mechanism, a bed including a first end disposed adjacent the tray input mechanism, the bed including one or more passageways configured to pass printing media through the bed, a vibration generator coupled to the bed and configured to vibrate the bed, and a part terminator disposed adjacent a second end of the bed. The method further comprises removing unprocessed printing media from the 3D printed parts in the automated breakout system and automatically transporting the 3D printed parts from the automated breakout system to a vibratory media cleaning system for removing printing media from the 3D printed parts. The vibratory media cleaning system includes a vibratory bin, a vibration generator coupled to the vibratory bin and configured to vibrate the vibratory bin, an automated parts loader configured to introduce 3D printed parts to be cleaned into the bin, and an automated parts removal mechanism. The method further comprises removing printing media from the 3D printed parts in the vibratory media cleaning system.

In some embodiments, the 3D printed parts are transported from the automated breakout system to the vibratory media cleaning system on a conveyor.

In some embodiments, the method further comprises automatically removing the 3D printed parts from the vibratory media cleaning system and transporting the 3D printed parts to a hopper. The method may further comprise separating 3D printed parts removed from the vibratory media cleaning system from vibratory media in the hopper. The method may further comprise returning vibratory media separated from the 3D printed parts in the hopper to the vibratory bin of the vibratory media cleaning system. The method may further comprise automatically transporting the vibratory media separated from the 3D printed parts in the hopper to a vibratory grading machine and removing printing media from the vibratory media separated from the 3D printed parts in the hopper in the vibratory grading machine prior to returning the vibratory media to the vibratory bin of the vibratory media cleaning system.

In some embodiments, the method further comprises automatically transporting the 3D printed parts from the hopper to a final clean apparatus. The method may further comprise removing printing media from the 3D printed parts in the final clean apparatus. The method may further comprise automatically removing the 3D printed parts from the final clean apparatus and automatically transporting the 3D printed parts to a sorting area.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
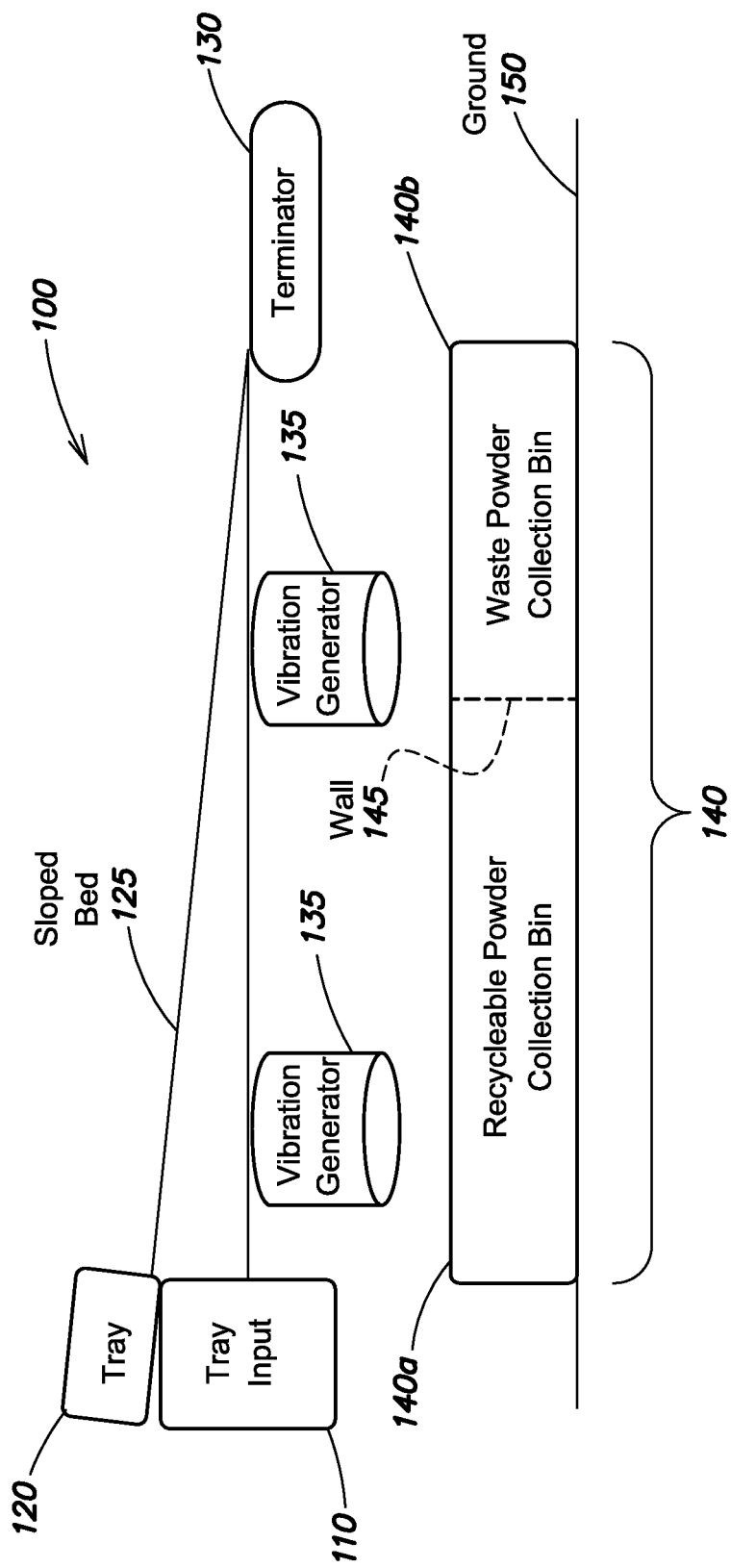
FIG. 1 is a schematic elevational view of an embodiment of an automated breakout system.

In a typical on-demand 3D printing process, a 3D model, such as a custom model uploaded by a customer, may be submitting to a manufacturer. The manufacturer may analyze the 3D model to determine whether it is 3D-printable. If the model is printable on a 3D printer, the manufacturer may accept the 3D model and queue the model for production planning. Production planning plans 3D print runs, i.e. builds of 3D models.

After production planning, one or more 3D parts based on the 3D model may be scheduled to be built inside a tray. In some examples, other 3D parts to be built based on other 3D models may also be assigned to the same tray. For example, a tray may be used to build 50-800 3D parts from various 3D models. The tray is then assigned to a 3D printer. The 3D printer utilizes a SLS process to print the parts by depositing successive layers of powdered printing media, for example, polymeric or metallic powder, and selectively sintering portions of each successive layer of printing media to build the parts layer by layer. The trays used in some examples of 3D printers may be in the form of bins having dimensions of from about one to two feet in depth and width by about two feet in height, although it should be appreciated that bins having other dimensions may also be used.

After 3D printing, the tray may contain multiple 3D printed parts, embedded in a volume of unsintered unprocessed printing media powder. According to one aspect, it is appreciated that typical 3D printing processes are non-optimal, particularly in a high volume production environment. In particular, removal of the 3D printed parts from the unprocessed printing media powder and cleaning of the 3D printed parts to remove any loosely adhered unprocessed printing media presents various challenges. 3D printing production currently takes place largely in batch mode. After trays are printed and removed from a 3D printing machine, parts embedded in the unprocessed printing media powder in the tray are removed from the tray and from the unprocessed printing media in the tray by hand. A single operator is typically required to remove parts from each tray. Pulling on parts to remove them from the unprocessed printing media may result in the application of uneven pressure to fragile areas of the 3D printed parts. Parts are thus often broken during manual removal from the unprocessed printing media in a tray.

After parts are removed from the tray, the parts may be manually cleaned using grit blasting and compressed air. This process causes many parts to fail as manual handling and the current cleaning method both apply pressure unevenly to the printed products. A single operator is typically required to clean each part in series.

As the demand for 3D printing services continues to grow, manufacturers of 3D printed parts need to efficiently process large numbers of 3D printed parts. Improved methods for separating 3D printed parts from unprocessed printing media and for cleaning the 3D printed parts which are more efficient and less prone to causing breakage of fragile 3D printed parts than currently employed manual methods are thus desirable.

Aspects and embodiments disclosed herein are directed to providing efficient and reliable methods of separation of 3D printed parts from unprocessed printing media in a tray after printing of the parts in a SLS 3D printer, also referred to herein as "breakout" of the parts from the tray. Aspects and embodiments disclosed herein are directed to systems and methods of cleaning the removed parts. Aspects and embodiments disclosed herein provide several advantages over previous systems and methods for breakout and cleaning of 3D printed parts. For example, some aspects and embodiments disclosed herein provide for continuous gentle vibratory breakout of 3D printed parts from trays which allows trays to be loaded and parts broken out in quick succession. This converts the previously employed batch mode manual process into a continuous breakout process and increases the yield of the process. The gentle vibratory separation of parts removes the need to tug on parts, as may occur in previously utilized manual breakout processes, and thus reduces part breakage.

Some aspects and embodiments disclosed herein provide for automation of the breakout process. Automation of the breakout process allows a single operator to oversee multiple tray breakouts—either one tray per vibratory lane or multiple trays feeing into the same lane.

Some aspects and embodiments disclosed herein include a vibratory cleaning apparatus which automates the process of cleaning 3D printed parts after breakout. Aspects and embodiments of the vibratory cleaning apparatus provide for continuous production and higher throughput than previously utilized batch mode manual cleaning systems and methods. Aspects and embodiments of the vibratory cleaning apparatus may clean many parts in parallel, removing the production bottleneck associated with manual cleaning. Vibratory cleaning media within the vibratory cleaning apparatus may support parts undergoing cleaning equally with uniform pressure, reducing the chance for part breakage due to the application of uneven pressures to the parts. Automation of the cleaning process allows a single operator to oversee the cleaning of parts from multiple trays—either one tray per vibratory cleaning machine or multiple trays feeding into a single machine.

Other aspects and embodiments disclosed herein are directed to a continuous production system in which 3D printed parts are automatically conveyed through an automated breakout apparatus and into and through a vibratory cleaning apparatus. Such a continuous production system further increases the efficiency and throughput of the breakout and cleaning operations as compared to previously utilized batch mode manual systems and methods.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the disclosed systems and methods or their components to any one positional or spatial orientation.

Referring to FIG. 1, there is illustrated one example of an automated breakout system 100. The system 100 includes a tray input mechanism 110 onto which an operator may load a tray 120 including unprocessed printing media and parts to be separated. The tray input mechanism 110 may comprise a nest including a platform shaped and sized to support a tray 120. The platform may be hinged so that the tray 120 may be raised and/or tilted into the position illustrated in FIG. 1 so that unprocessed printing media and parts may flow out of the tray 120. In some embodiments, the tray may be loaded vertically and clamped into the tray input mechanism 110 by mounts and/or clamps located on an upper and/or lower part of the tray 120 and/or on the tray input mechanism 110 proximate an upper and/or lower part of a tray 120 loaded onto the tray input mechanism 110. The clamping part of the tray input mechanism 110 may be mounted on a pivot and may be configured to rotate over 90 degrees, allowing the tray 120 to be rotated into a substantially horizontal position with a slight tip downward. The rotation of the tray 120 and clamping part of the tray input mechanism 110 may be actuated by, for example, a pneumatic cylinder or other actuator known in the art.

In another embodiment, a movable plate may be placed at the bottom of a tray 120. The moveable plate would then serve as the building platform upon which the printing media from which the 3D printed parts are formed is disposed. When printing of the 3D printed parts is complete and the parts are ready to be separated from the unprocessed printing media, the bottom plate of the tray 120, which would now sit directly below the movable plate, would be raised, revealing the 3D printed parts and unprocessed printing media all in one block. The movable plate may then be tipped upward allowing the 3D printed parts and unprocessed printing media to slide off and into the automated breakout system 100. For larger builds the back of the block of 3D printed parts and unprocessed printing media may be pushed mechanically by a large flat plate perpendicular to the movable plate with a powered actuator, for example, a pneumatic piston or other form of actuator known in the art or lever to provide mechanical advantage.

In some embodiments, the printing media and printed parts may flow out of the tray 120 under the influence of gravity, may be manually removed from the tray 120, or may be pushed out of the tray 120 by manually or automatically pushing on a movable bottom plate or piston disposed within the body of the tray 120. A linear actuator, for example, a pneumatic piston or other actuator known in the art, with an adapter that interfaces with attachment points present on the outside of the bottom plate of the tray 120 may be used to push the bottom plate of the tray 120 outward, pushing the printed parts and unprocessed printing media with it.

Alternatively or additionally, the tray input mechanism 110 may comprise an elevator so that an operator may load a tray 120 onto the elevator at floor level and have the elevator lift the tray 120 into the position shown in FIG. 1. The use of an elevator to raise the tray 120 into position may reduce ergonomic risks associated with having the operator lift the tray 120, which may weigh, in a typical configuration, from about 50 pounds to about 350 pounds (about 23 kg to about 160 kg), into position.

Adjacent to the tray input mechanism 110 is a sloped bed 125. The sloped bed 125 may include a sheet of metal, for example, steel or aluminum, a polymeric sheet, or a sheet of any suitable material. Unprocessed printing media and parts to be separated may be moved from the tray 120 onto the sloped bed 125. In one embodiment, the sloped bed 125 runs from the tray input mechanism 110 to a part terminator 130, which may comprise a bin or conveyor for collecting parts from the automated breakout system 100.

Vibrational energy is applied to the sloped bed 125 by one or more vibration generators 135 mechanically coupled to the sloped bed 125. The vibration generator(s) 135 may include, for example, electric motors with offset weights coupled to their shafts, ultrasonic generators, or any other form of vibration generator known in the art. Gentle vibrations continuously induced in the sloped bed 125 by the vibration generator(s) 135 cause parts to move from the tray input mechanism 110, down the sloped bed 125, to the part terminator 130. The frequency and/or intensity of vibrations produced by the vibration generator(s) 135 may be selected based on the type of printing media and/or the size and quantity of fabricated parts to be separated from unprocessed printing media in the automated breakout system 100.

The sloped bed 125 includes passageways, for example, perforations 155 sized to allow unprocessed printing media powder to fall through the sloped bed 125 into a powder collection bin 140 disposed on the ground 150 beneath the sloped bed 125. The perforations 155 may be sized so that printing media powder, but not fabricated parts, fall through.

The powder collection bin 140 may be separated by a partition 145 into two portions—a recyclable powder collection bin 140a and a waste powder collection bin 140b. Alternatively, the recyclable powder collection bin 140a and the waste powder collection bin 140b may be different unconnected bins. The recyclable powder collection bin 140a may be disposed under a portion of the sloped bed 125 adjacent the tray input mechanism 110 and may extend beneath a partial length of the sloped bed 125, for example, from about 50% to about 75%, or about two-thirds of the length of the sloped bed 125 in a direction from the tray input mechanism 110 toward the part terminator 130. The waste powder collection bin 140b may extend from a position where the recyclable powder collection bin 140a terminates to a position beneath the end of the sloped bed 125 adjacent the part terminator 130. The recyclable powder collection bin 140a may be utilized to collect printing media powder that falls through the perforations in the sloped bed 125 which may be reused to fabricate additional 3D printed parts.

Printing media powder may generally be recycled and reused to fabricate additional 3D printed parts if the powder had not been exposed to sufficiently high temperatures during a previous printing operation such that the grain size or other physical properties of the printing media powder were altered. Printing media powder which does not or only loosely adheres to printed parts and thus falls through the sloped bed 125 early during the travel of the parts along the sloped bed 125 may typically satisfy this criterion. Printing media powder which is located more closely to surfaces of printed parts or which adheres to printed parts passing along the sloped bed 125 may have been exposed to temperatures during the printing of the parts that altered the physical properties of the printing media, rendering the printing media unsuitable for reuse. Printing media powder unsuitable for reuse may fall through the perforations in the sloped bed 125 later than printing media powder which may be suitable for recycling and reuse, and may thus fall into the waste powder collection bin 140b from which it may be periodically collected and disposed of.

In some embodiments, the distribution and/or size of the perforations 155 may vary along the length of the sloped bed and/or from a center portion of the sloped bed 125 to side portions of the sloped bed 125. For example, in a first portion of the sloped bed 125 proximate the tray input mechanism 110, there may be a more numerous or larger perforations 155 than in a portion of the sloped bed 125 proximate the part terminator 130. The more numerous and/or larger perforations 155 in the sloped bed 125 proximate the tray input mechanism 110 may provide for loose unprocessed printing media to be quickly removed to the powder collection bin 140 so that the majority of the sloped bed 125 may be used to separate printing media which more strongly adheres to the parts. In other embodiments, the perforations 155 may be concentrated away from the sides of the sloped bed 124 to direct loose printing media into the powder collection bin 140 while minimizing spills. The perforations 155 may be circular or substantially circular in cross section, or may additionally or alternatively be formed as slots or with oval, triangular, square, or any other suitably shaped cross section.

Figure 2:
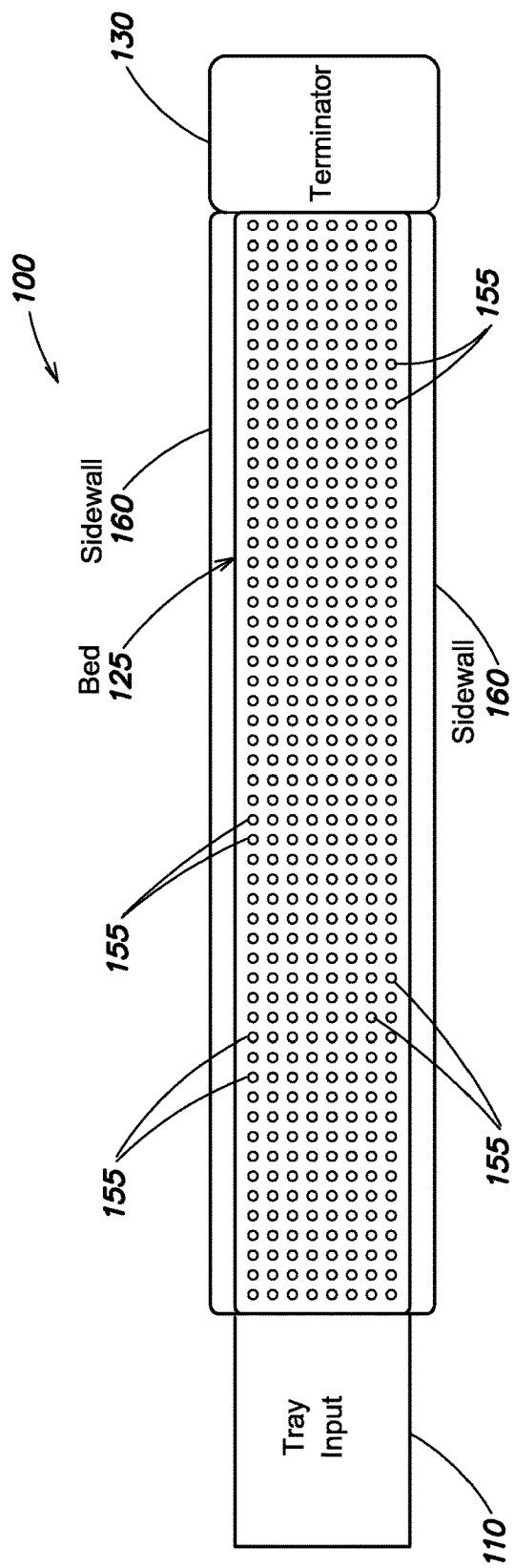
FIG. 2 is a schematic plan view of an embodiment of an automated breakout system.

FIG. 2 is a plan view of an embodiment of the automated breakout system 100. FIG. 2 shows the multiple perforations 155 which may be present in the sloped bed 125 that may provide for printing media to fall through the sloped bed 125 into the powder collection bin 140. Also illustrated in FIG. 2 is a pair of sidewalls 160 that may be disposed on sides of the sloped bed 125. The sidewalls 160 may keep parts from falling off of the sloped bed 125 prior to reaching the part terminator 130. The sidewalls 160 may be of a height sufficient to keep parts from falling off of the sloped bed 125 but low enough so that an operator may access the surface of the sloped bed 125 to, for example, clean the sloped bed 125, remove broken parts, or separate parts which have become entangled or which are causing a blockage to the flow of printing media and parts on the sloped bed 125. The sidewalls 160 may be constructed of a transparent material, for example, Plexiglas™ poly(methyl methacrylate), so that an operator may see through the sidewalls 160 and easily view parts and printing media passing along the surface of the sloped bed 125.

Figure 7:
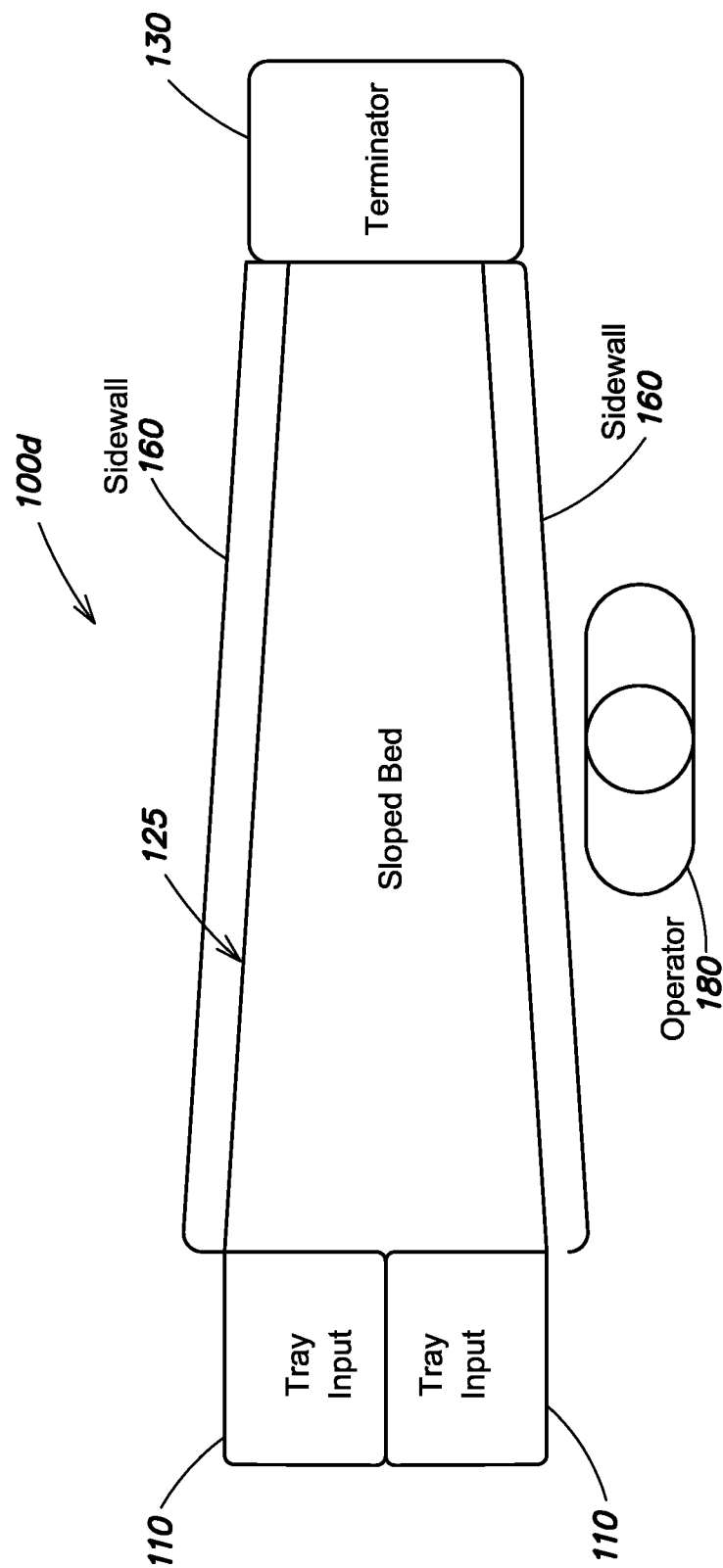
FIG. 7 is a schematic plan view of another embodiment of an automated breakout system.

Although the sidewalls 160 are illustrated as parallel in FIG. 2, it should be appreciated that in any of the embodiments disclosed herein, the width of the sloped bed 125 may vary along its length, for example, by narrowing along a length from the tray input mechanism 110 to the part terminator 130, for example, as illustrated in FIG. 7 described below. The distance between the sidewalls 160 may thus change, for example, narrow along a length of the sloped bed 125 from the tray input mechanism 110 to the part terminator 130.

Figure 3:
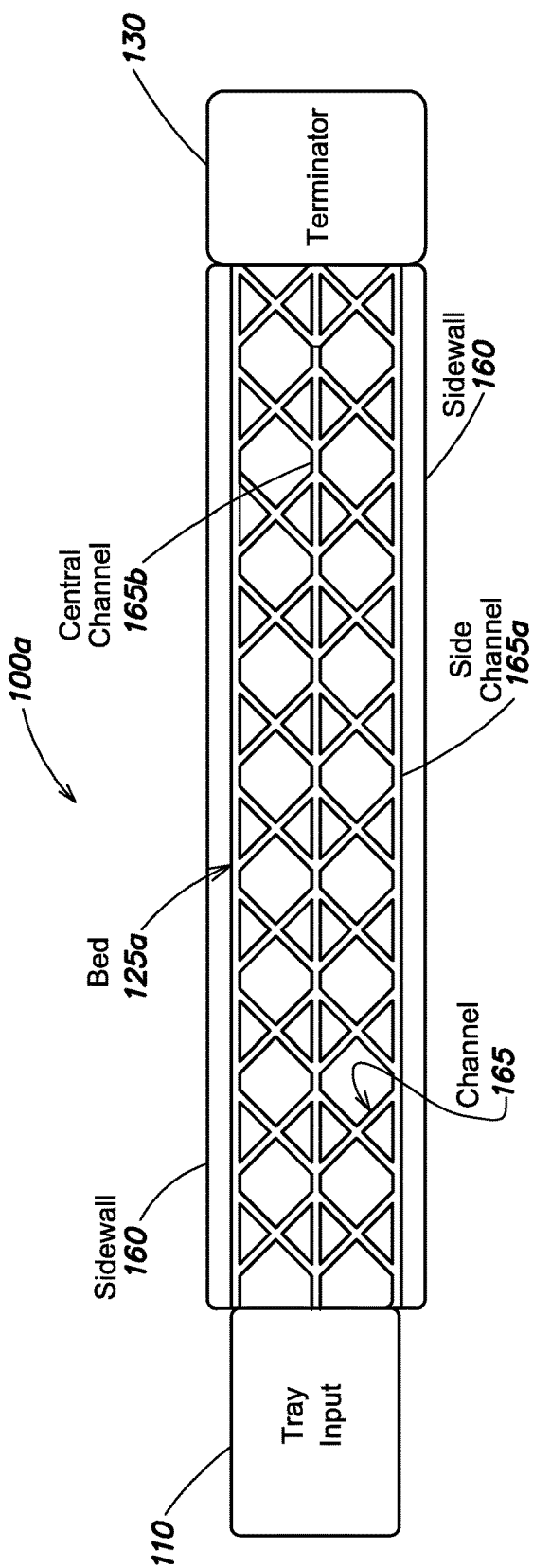
FIG. 3 is a schematic plan view of another embodiment of an automated breakout system.

In an alternate embodiment, as illustrated in FIG. 3 generally at 100a, in addition to, or as an alternative to the perforations 155, the sloped bed 125a may include one or more channels 165 defined in the upper surface of the sloped bed 125a which may direct printing media removed from the printed parts on the sloped bed 125a to one or more side channels 165a or central channels 165b from which the printing media is directed into the powder collection bin 140 through passageways, for example, perforations or slots in the channels 165, 165a, and/or 165b. Portions of the surface of the sloped bed 125a may be inclined toward the central and/or side regions of the sloped bed 125a to facilitate the flow of printing media powder into the side channels 165a and/or central channel 165b.

Figure 4:
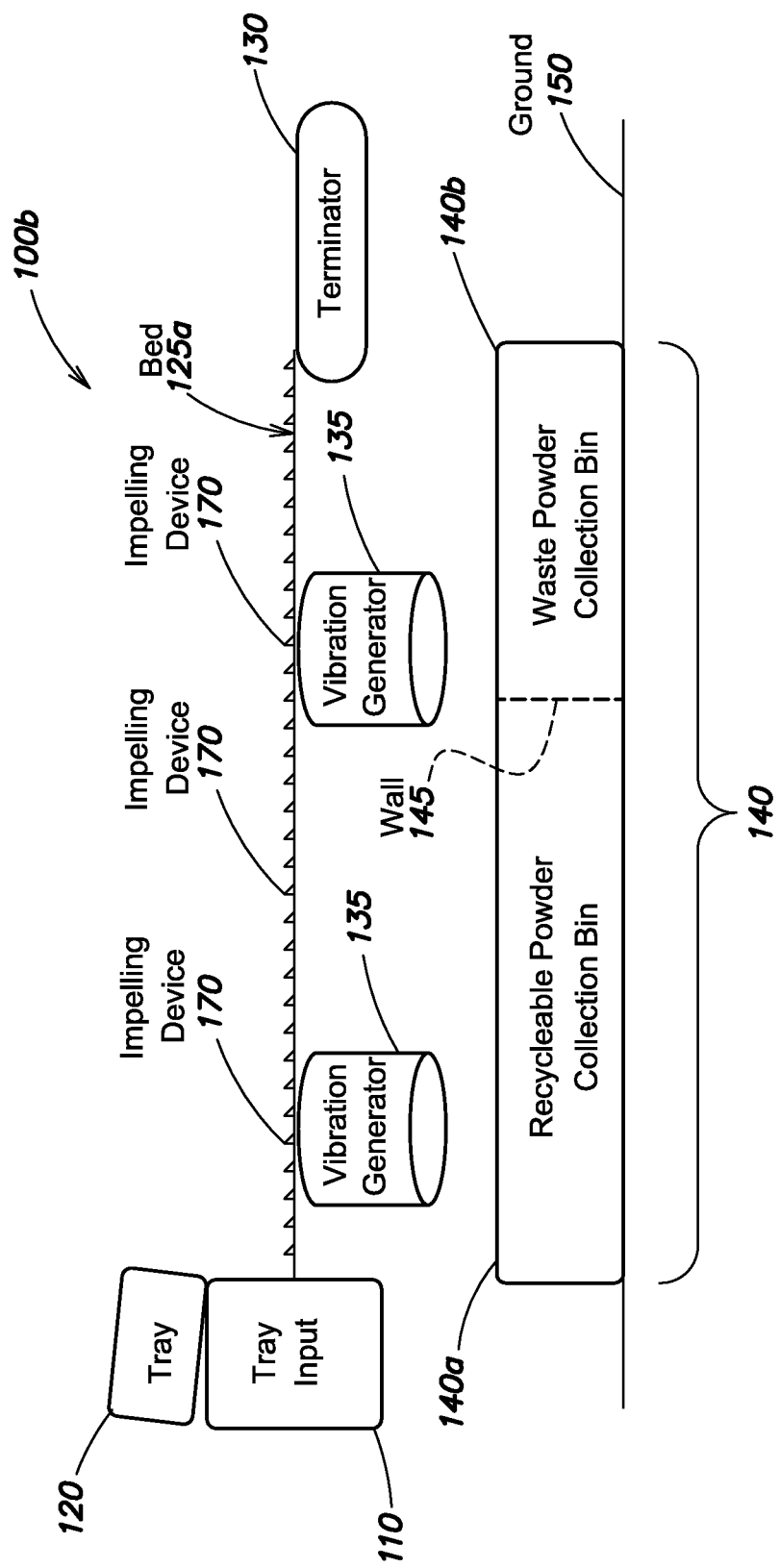
FIG. 4 is a schematic elevational view of another embodiment of an automated breakout system.

In another alternate embodiment, as illustrated in FIG. 4 generally at 100b, in addition to or as an alternative to being sloped to facilitate the transport of printing media and parts across the sloped bed 125, an alternative design of the bed 125a may include one or more impelling devices 170, for example, one or more directional needles, ridges, wedges or other forms of impelling devices which move the printing media and parts across the bed 125a when the bed is vibrated by the vibration generator(s) 135. The impelling devices may not only move the printing media and parts along the surface of the bed 125a, but may also facilitate separating different parts from one another. In such embodiments, the bed 125a may be downwardly sloped from the tray input mechanism 110 to the part terminator 130, or may be horizontal or substantially horizontal as illustrated in FIG. 4.

Other impelling devices or mechanisms for facilitating the transport of printing media and parts across the sloped bed 125 (or non-sloped bed 125a) may be utilized in addition to or as an alternative to those described above. Examples of such mechanisms include directing air or another fluid, for example, water or alcohol, across the bed 125, 125a in the direction from the tray input mechanism 110 to the part terminator 130 and/or through the perforations 155 in the bed 125, 125a to push or carry the printing media and printed parts along the bed 125, 125a and/or to push or carry printing media powder through the perforations 155. Another example is the use or electrostatic force to move charged particles of printing media powder and/or parts across the surface of the bed 125, 125a and/or through the perforations 155. Additionally or alternatively, one or more brushes may be utilized as impelling devices to sweep printing media and printed parts along the bed 125, 125a.

Figure 5:
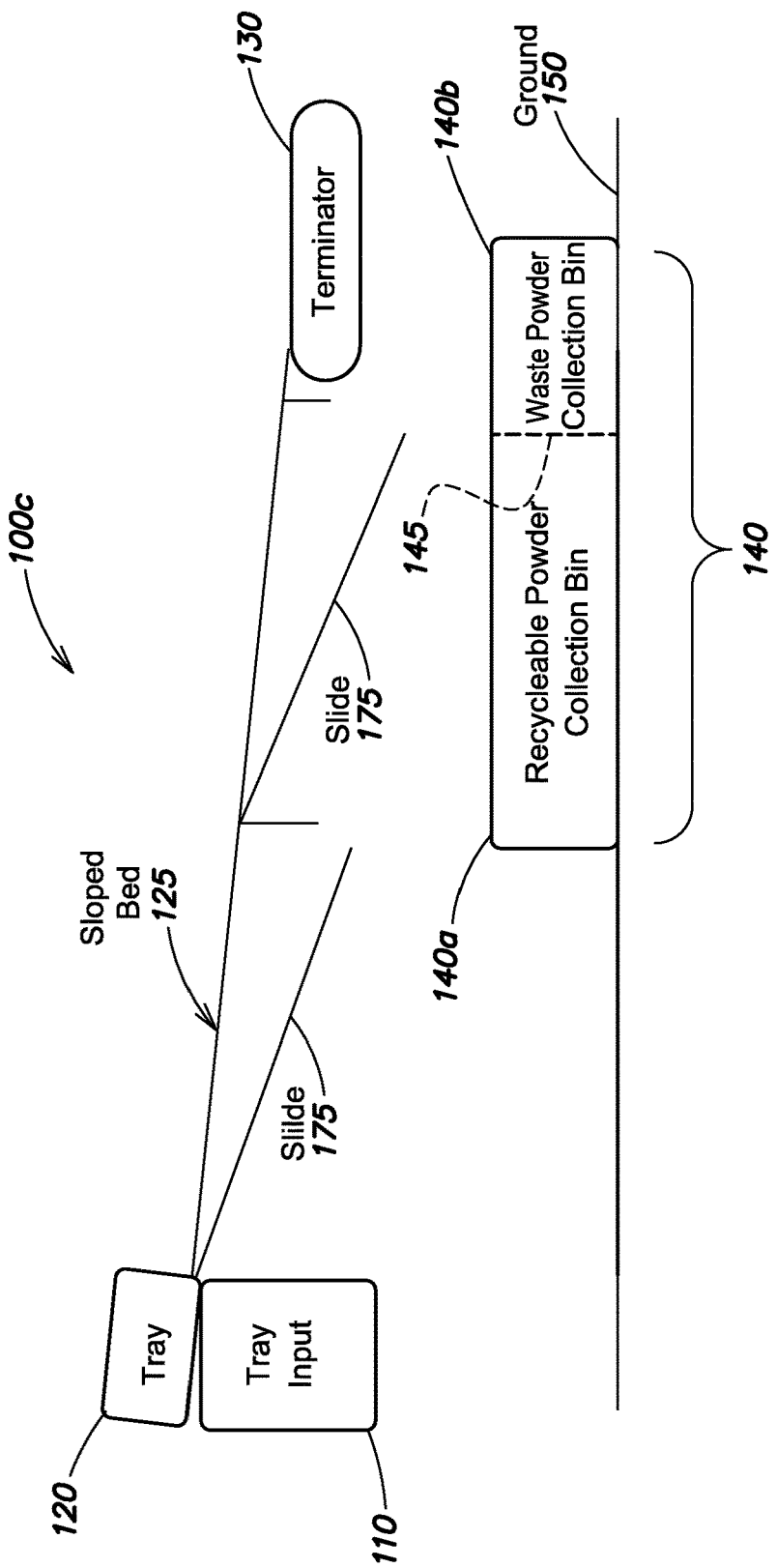
FIG. 5 is a schematic elevational view of another embodiment of an automated breakout system.

In various embodiments, for example, in the embodiment illustrated in FIG. 5, referenced generally at 100c, the automated breakout system 100c may include one or more chutes, troughs, or slides 175 which may guide printing media powder passing through the sloped bed 125 into the powder collection bin 140. Where both a recycleable powder collection bin 140a and a waste powder collection bin 140b are present, different chutes, troughs, or slides 175 may guide recycleable and waste powder into the recycleable powder collection bin 140a and waste powder collection bin 140b, respectively. The vibration generator(s) 135 are omitted from FIG. 5 for clarity.

Figure 6:
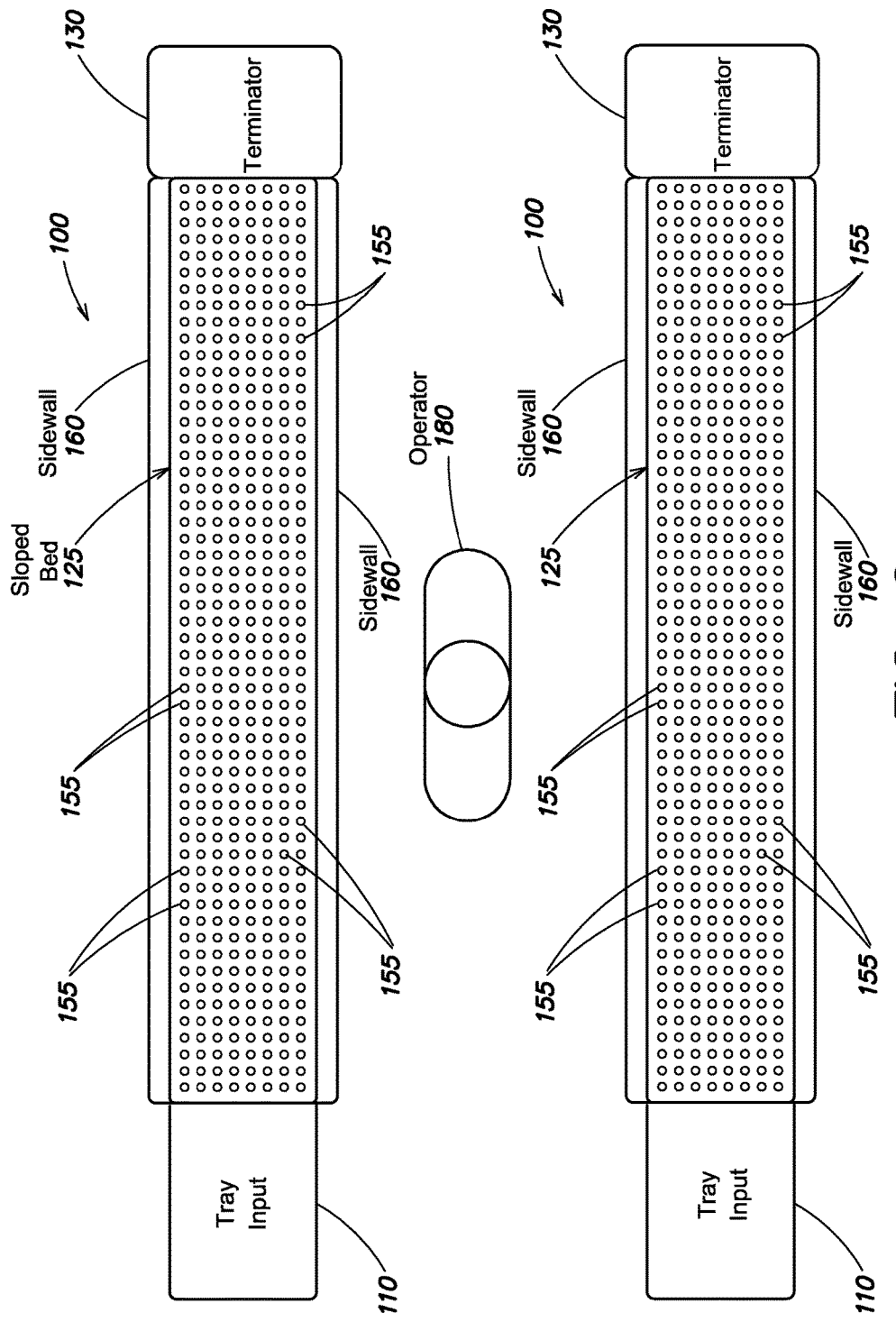
FIG. 6 is a schematic plan view of another embodiment of an automated breakout system.

Automating the part breakout process by the use of automated breakout systems 100 as disclosed herein may reduce the number of operators required to oversee or perform the breakout of printed parts from trays as compared to previously performed manual processes and system. For example, automatic dispensing of printing media and parts from trays 120 and automatic transport of the parts along a bed 125, 125a for the removal of printing media and into a part terminator 130 may allow a single operator 180 to oversee multiple automated breakout systems 100 concurrently, as illustrated in FIG. 6. Additionally, an automated breakout system may be utilized to process printing media and printed parts from multiple trays 120 on multiple tray input mechanisms 110 at once, as illustrated in the automated breakout system indicated generally at 100d in FIG. 7.

Figure 8:
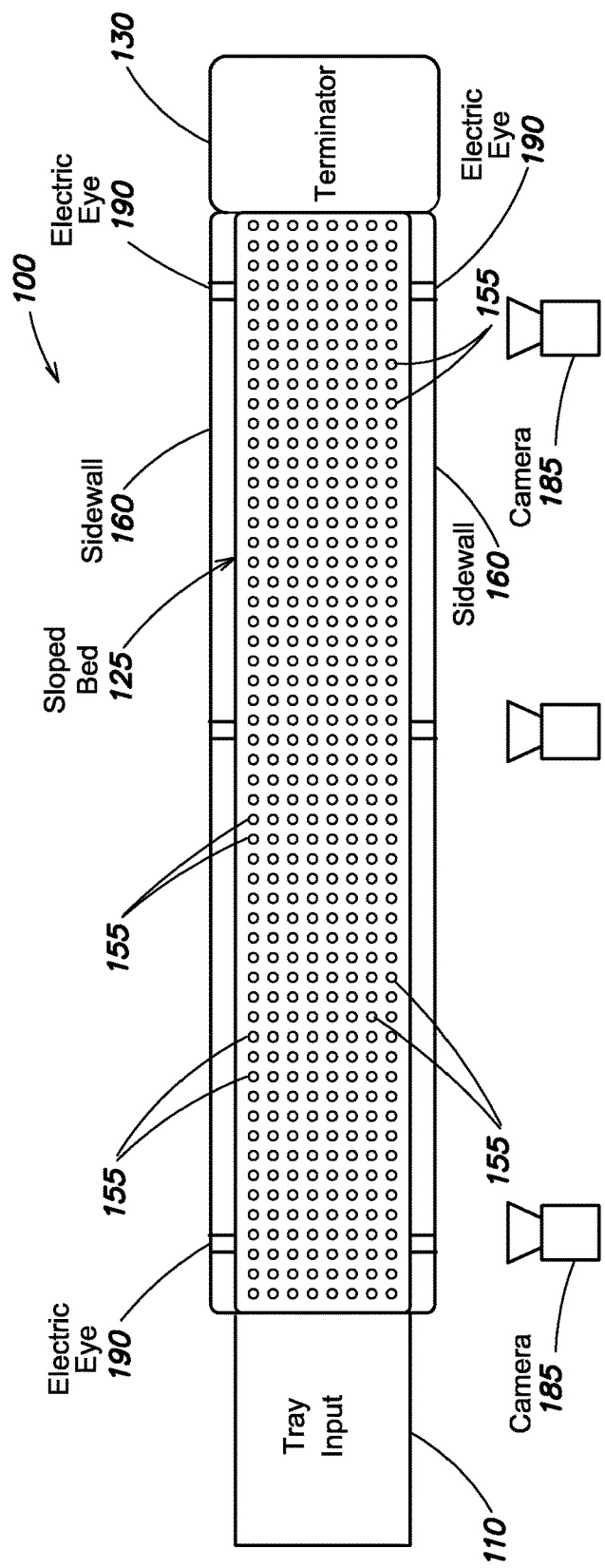
FIG. 8 is a schematic plan view of another embodiment of an automated breakout system.

Embodiments of the automated breakout system 100 (and any of 100a-100d) may include one or more monitoring systems that may be utilized to monitor and control the operation of the automated breakout system 100. The monitoring systems may include, for example, one or more cameras 185 and/or one or more electric eyes 190, as illustrated in FIG. 8. The camera(s) 185 and/or electric eye(s) 190 may be used to optically observe the passage of printing media and printed parts along the sloped bed 125 and provide data regarding the observations to a computer system 600 (not illustrated in FIG. 8, but described below). In some embodiments, ultrasonic transducers may be used in addition to or in place of the camera(s) 185 and/or electric eye(s) 190 to sense the presence and/or passage of printing media and/or fabricated parts along the sloped bed 125.

The computer system 600 may analyze the data from the camera(s) 185 and/or electric eye(s) 190 and/or ultrasonic transducers and may adjust one or more operating parameters of the automated breakout system 100 based on the analysis. For example, if the data from the camera(s) 185 and/or electric eye(s) 190 and/or ultrasonic transducers indicate that there is a blockage of printing media and/or parts on the sloped bed 125 or any other form of failure, the computer 600 may cause the system 100 to halt by turning off the vibration generator(s) 135 and/or terminating the introduction of additional material onto the sloped bed 125 from any tray or trays 120 mounted on the tray input mechanism(s) 110 of the system 100 and may activate an alarm alerting an operator of a need to attend to the system 100. If the data from the camera(s) 185 and/or electric eye(s) 190 and/or ultrasonic transducers indicate that less than a desired amount of material is flowing along the sloped bed 125, the computer 600 may instruct a mechanism used to push material out of any tray or trays 120 mounted on the tray input mechanism(s) 110 of the system 100 to increase the rate of introduction of material onto the sloped bed. If the data from the camera(s) 185 and/or electric eye(s) 190 and/or ultrasonic transducers indicate that greater than a desired amount of material is flowing along the sloped bed 125, the computer 600 may instruct a mechanism used to push material out of any tray or trays 120 mounted on the tray input mechanism(s) 110 of the system 100 to decrease the rate of introduction of material onto the sloped bed 125.

Figure 9:
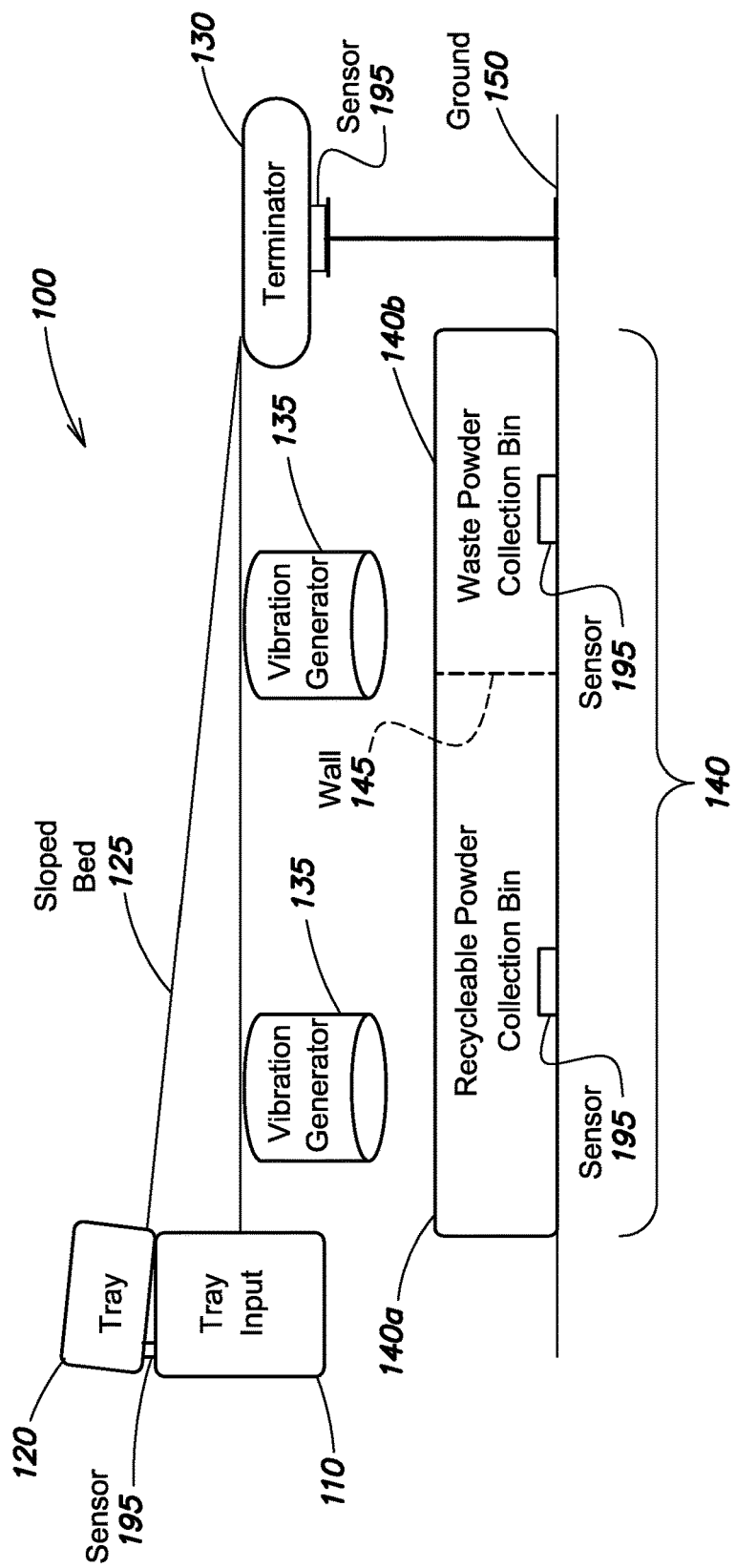
FIG. 9 is a schematic elevational view of another embodiment of an automated breakout system.

Additional sensors, for example, additional camera(s) 185 and/or electric eye(s) 190 and/or ultrasonic transducers and/or weight sensors 195 (FIG. 9) may be utilized to monitor the state of any one or more of the tray(s) 120 mounted on the tray input mechanism(s) 110 of the system 100, the powder collection bin 140 or the individual recycleable powder collection bin 140*a* and waste powder collection bins 140*b*, and the part terminator 130. These additional sensors could monitor the weight of the tray(s) 120 and provide data regarding the measured weight(s) to a computer system 600 which could analyze the data and determine when the trays 120 were empty or nearly empty so a new tray 120 could be queued up for processing. The additional sensors could monitor the weight of the powder collection bins 140, 140*a*, 140*b* and provide data regarding the measured weights to a computer system 600 which could analyze the data and determine when the powder bins 140, 140*a*, 140*b* were full or nearly full so that an operator could be alerted that they would soon require emptying. The additional sensors could monitor the part terminator 130 and provide data regarding the weight of the part terminator 130, in embodiments where the part terminator 130 comprises a bin, to a computer 600 which would analyze the data to determine when the part terminator 130 were full or nearly full so that an operator could be alerted that it would soon require emptying.

In embodiments where the part terminator 130 comprises a conveyor, the additional sensors could monitor and provide data regarding the number of parts passing along the conveyor to a computer system 600 which would analyze the data to determine if a fault, for example, a blockage or other malfunction of the conveyor had occurred and activate an alarm to alert an operator to a fault condition should one occur.

Fabricated parts which have passed through embodiments of the automated breakout system 100 disclosed herein may be substantially free of unprocessed printing media powder. In many instances, however, printing media powder that was proximate a surface of a part during the printing of the part may have absorbed enough heat from the sintering process used to print the part to partially sinter and thus loosely adhere to the printed part. At least some of this loosely adhered printing media, as well as printing media that may have migrated into recesses in a part, may remain on and/or in the part after the part passed through the automated breakout system 100. Thus, it has been found advantageous to perform additional cleaning of parts after they have passed through the automated breakout system 100 to remove any remaining printing media adhered to or contained within the parts. It has been found that aspects and embodiments of a continuous vibratory media cleaning system as disclosed herein may successfully remove printing media remaining on or in parts after passing through an automated breakout system 100.

Figure 10:
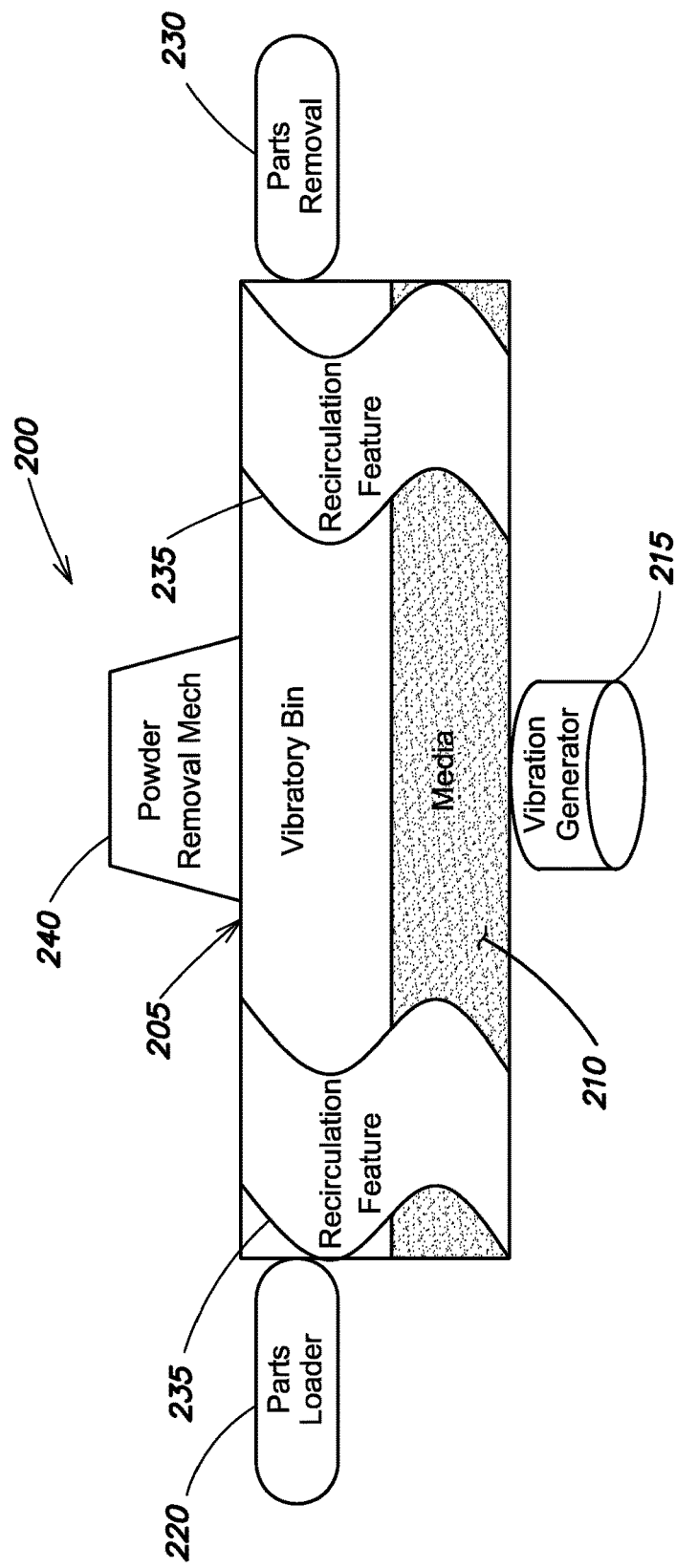
FIG. 10 is a schematic cross-sectional view of an embodiment of a vibratory media cleaning system.
Figure 11:
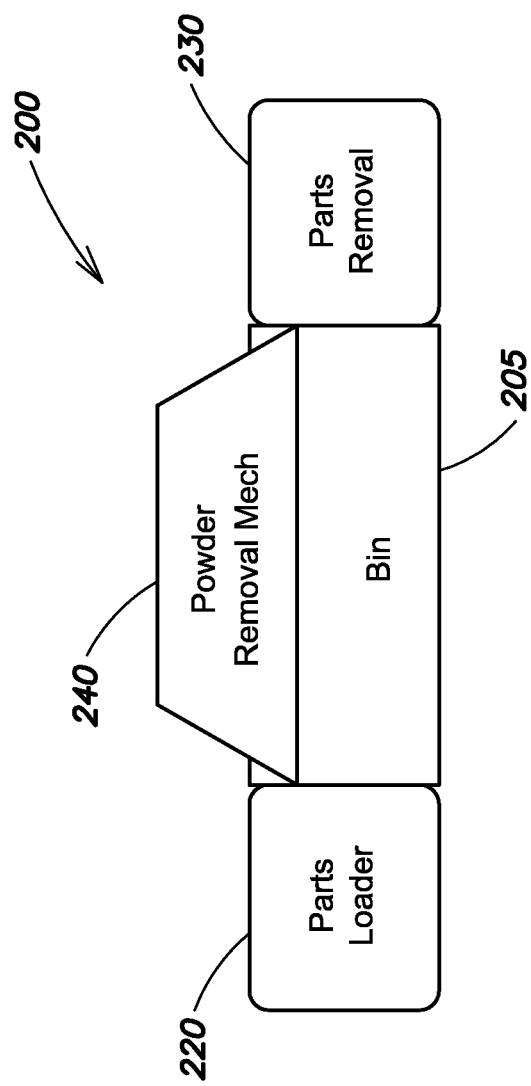
FIG. 11 is a schematic plan view of an embodiment of a vibratory media cleaning system.

An embodiment of a vibratory media cleaning system, indicated generally at 200, is illustrated in cross section in FIG. 10 and in a plan view in FIG. 11. The vibratory media cleaning system 200 includes a vibratory bin 205. The vibratory bin 205 is at least partially filled with vibratory media 210. The vibratory media 210 preferably has a particle size small enough to fit into recesses and crevices in parts to be cleaned in the vibratory media cleaning system 200 so the vibratory media 210 may reach and dislodge printing media remaining within the recesses and crevices. For example, the vibratory media 210 may include particles having diameters of less than about one mm, from about 0.3 mm to about 0.6 mm, about 0.5 mm, or less than about 0.5 mm.

The vibratory media 210 may comprise particles or beads of any suitable material, for example, glass, a hard polymer, a composite material, or a metal. Additionally or alternatively, the vibratory media 210 may include small rods of material, for example, glass, polymer, ceramic, composite, or metal rods having diameters of less than about 0.5 mm or between about 0.25 mm and about 0.5 mm and lengths of between about 0.5 mm and about 5 mm.

One or more vibration generators 215 are mechanically coupled to the bin 205 and impart vibrational energy to the bin 205 to excite the vibratory media 210 and cause it to impact parts in the bin 205 and remove remaining printing media from the parts. The vibration generator(s) 215 may include, for example, electric motors with offset weights coupled to their shafts, ultrasonic generators, or any other form of vibration generator known in the art.

Parts to be cleaned are automatically loaded into the bin 205 through an automated parts loader 220. The automated parts loader 220 may include, for example, a conveyor and/or a bin.

Due to a difference in density and stiffness between the vibratory media 210 and the 3D printed parts being cleaned in the vibratory media cleaning system 200, the vibratory media 210 may separate from the parts, reducing the effectiveness of the cleaning process. To reduce the degree to which the vibratory media 210 separates from the parts, or to eliminate the separation of the vibratory media 210 from the parts altogether, the vibratory media cleaning system 200 may include one or more recirculation features 235. The recirculation features 235 may ensure a correct mixture of parts and vibratory media 210. The recirculation features 235 may include the vibration generator(s) 215 and a curved floor of the bin.

The vibration generator(s) 215 may cause the bin 205 to vibrate back and forth rapidly, causing the vibratory media 210 and parts to hit the side walls of the bin 205 and fall back down. This motion, along with the curved bottom of the bin 205, creates a wave of vibratory media 210 that falls down, gets pulled under into the curved floor portion and pushed backed up the wall of the bin 205 again. In other embodiments, the recirculation features 235 may include one or more air blowers and/or one or more mechanical mixers which mix the vibratory media 210 and the parts in the bin 205 to reduce or eliminate separation of the vibratory media 210 from the parts.

During the process of cleaning parts in the vibratory media cleaning system 200, printing media removed from the parts may be released into the surrounding air. To collect this removed printing media, the vibratory media cleaning system 200 may include a powder removal mechanism 240. The powder removal mechanism 240 may include, for example, an air hood including a fan and filter arrangement.

Parts may be processed for a set amount of time in the vibratory media cleaning system 200 and then removed. The parts may be manually removed or automatically removed by an automated parts removal mechanism 230. The automated parts removal mechanism 230 may include, for example, a conveyor. In some embodiments the parts removal mechanism 230 may include a perforated basted that is passed through the vibratory media 210 while it is in the bin 205, letting the vibratory media 210 through and retaining the parts. Alternatively, or additionally the inside of the bin 205 may be lined with a stiff perforated liner of the same shape as the bin 205 which may be lifted out of the bin 205, allowing the vibratory media 210 to fall through while retaining the parts. The liner may then be tipped over to remove the parts.

In some embodiments, after a set of parts have been cleaned in the bin 205 for a desired period of time, the entire bin 205 may be tipped to pour the vibratory media 210 and parts onto the automated parts removal mechanism 230. A wall or a portion of a wall of the bin 205 may open to aid the removal of the vibratory media 210 and parts from the bin 205 while only tipping the bin 205 slightly.

Figure 12:
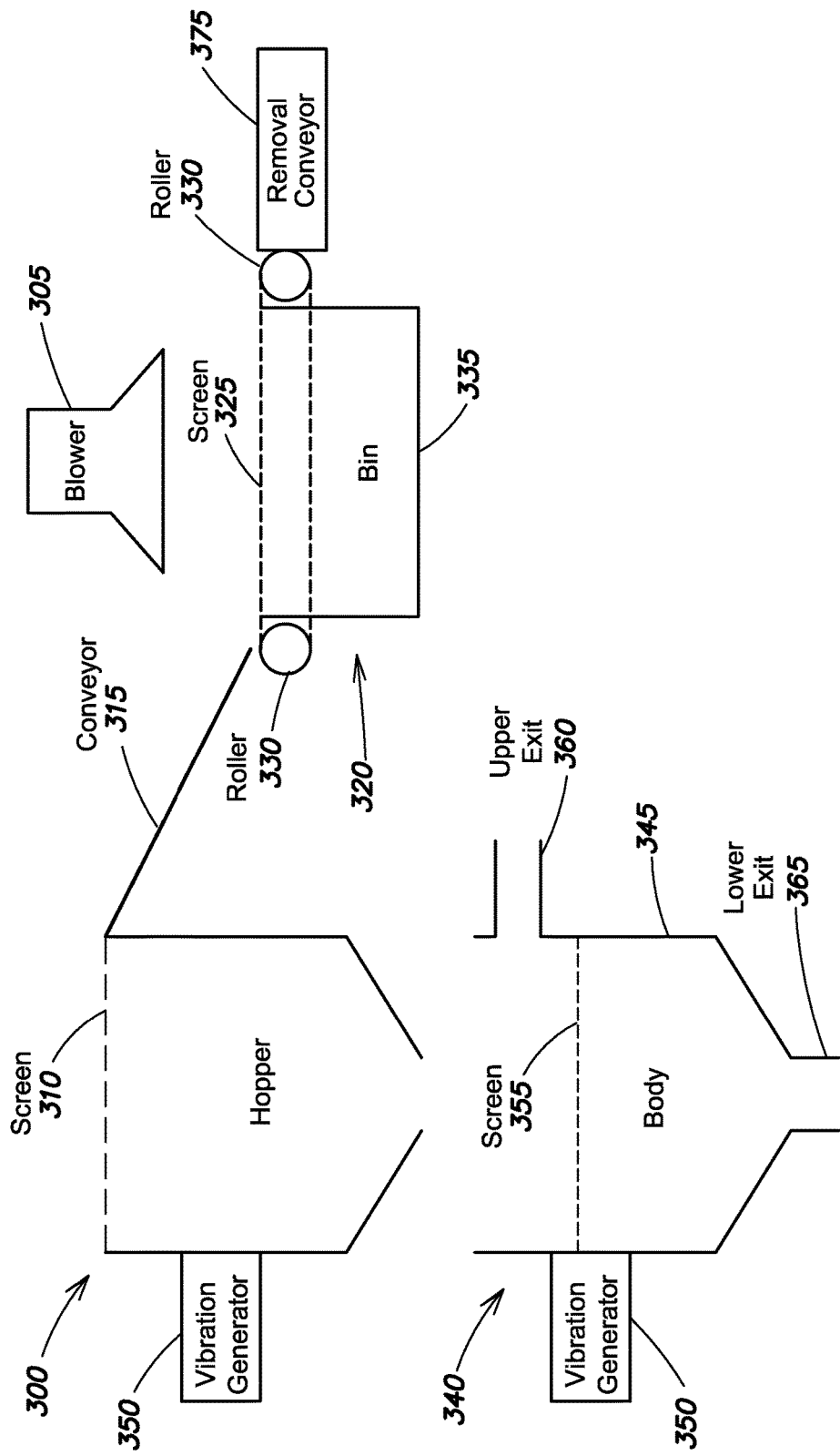
FIG. 12 is a schematic view of a portion of a post-processing system for cleaning 3D printed parts including a hopper, a vibratory grading machine, and a final clean apparatus.

The automated parts removal mechanism 230 may deliver the vibratory media 210 and parts mixture to a hopper 300, illustrated in FIG. 12, to separate the parts from the vibratory media 210. The hopper 300 may include a screen 310 with a mesh sized so the vibratory media 210 can pass through the screen 310 while the parts remain on top. The screen 310 may vibrate to improve the rate and/or effectiveness at which the vibratory media 210 falls through the screen 310. Vibration of the screen 310 may also facilitate the removal of vibratory media 210 from the inside of any hollow parts. The screen 310 may be vibrated by a vibration generator 350 coupled to the body of the hopper 300 or directly to the screen 310. The vibration generator 350 may include, for example, an electric motor with an offset weight coupled to its shaft, an ultrasonic generator, or any other form of vibration generator known in the art.

After vibratory media 210 is removed from the parts in the hopper 300, the parts may be transported down a ramp or conveyor 315 to a final clean apparatus 320. The screen 310 of the hopper 300 may be tilted toward the ramp or conveyor 315 to automatically move parts from the screen 310 to the ramp or conveyor 315. Additionally or alternatively the screen 310 of the hopper 300 may be in the form of a belt driven by a pair of rollers, as illustrated in the final clean apparatus 320 that may automatically deliver parts from the hopper to the ramp or conveyor 315.

The final clean apparatus 320 may include a screen 325, which may be a vibrating screen, through which any remaining vibratory media 210 and/or printing media is removed from the parts. Additionally or alternatively, a stream of air may be passed through the screen 325 from a blower 305 or sucked through the screen 325 by a vacuum to remove remaining vibratory media 210 and/or printing media from the parts. The screen 325 may be in the form of a belt driven by a pair of rollers 330 that may pass parts over a powder collection bin 335 of the final clean apparatus 320. The speed of the rollers 330 may be adjusted to provide for the parts to spend a desired amount of time in the final clean apparatus 320 to remove a desired amount of remaining vibratory media 210 and/or printing media. After final cleaning, the parts may be removed from the final clean apparatus 320, for example, by being conveyed by the screen 325 onto a removal conveyor 375 or bin and sent on for sorting. Vibratory media 210 and/or printing media collected in the powder collection bin 335 may be disposed of.

In some embodiments, the final clean apparatus 320 may be substantially similar to the automated breakout system 100 described above, optionally with the addition of a blower 305 or other source of compressed air utilized to blow remaining printing media off of the parts on the sloped bed. A vacuum beneath or adjacent the sloped bed may be utilized to collect printing powder removed from the parts.

The vibratory media 210 separated from the parts in the hopper 300 may be conveyed from the bottom of the hopper 300 into a vibratory grading machine 340. Additionally or alternatively, a conveyor, for example, a screw conveyor may be utilized to transport vibratory media 210 from the hopper to the vibratory grading machine 340. The vibratory grading machine 340 includes a body 345 which is vibrated by a vibration generator 350. The vibration generator 350 may include, for example, an electric motor with an offset weight coupled to its shaft, an ultrasonic generator, or any other form of vibration generator known in the art. The vibratory grading machine 340 further includes a screen 355, an upper exit port 360, and a lower exit port 365. Remaining printing media which may be mixed with the vibratory media 210 which is introduced into the vibratory grading machine 340 may pass through the screen 355 and out of the lower exit port 365 and may be disposed of. Vibratory media 210 from which residual printing media has been removed may exit the vibratory grading machine 340 through the upper exit port 360 and may be recycled to the bin 205 of the vibratory media cleaning system 200. For example, vibratory media 210 may be returned from the vibratory grading machine 340 back to the bin 205 by a screw conveyor or similar device.

In another embodiment, after separating the vibratory media 210 from the parts, the hopper 300 may tip up and dump the vibratory media 210 back onto the automated parts removal mechanism 230 for recycling into the bin 205. Alternatively, the automated parts removal mechanism 230 may be omitted and the vibratory media 210 and parts mixture may be delivered directly from the bin 205 into the hopper and the separated vibratory media 210 may be returned directly from the hopper 300 to the bin 205.

Figure 13:
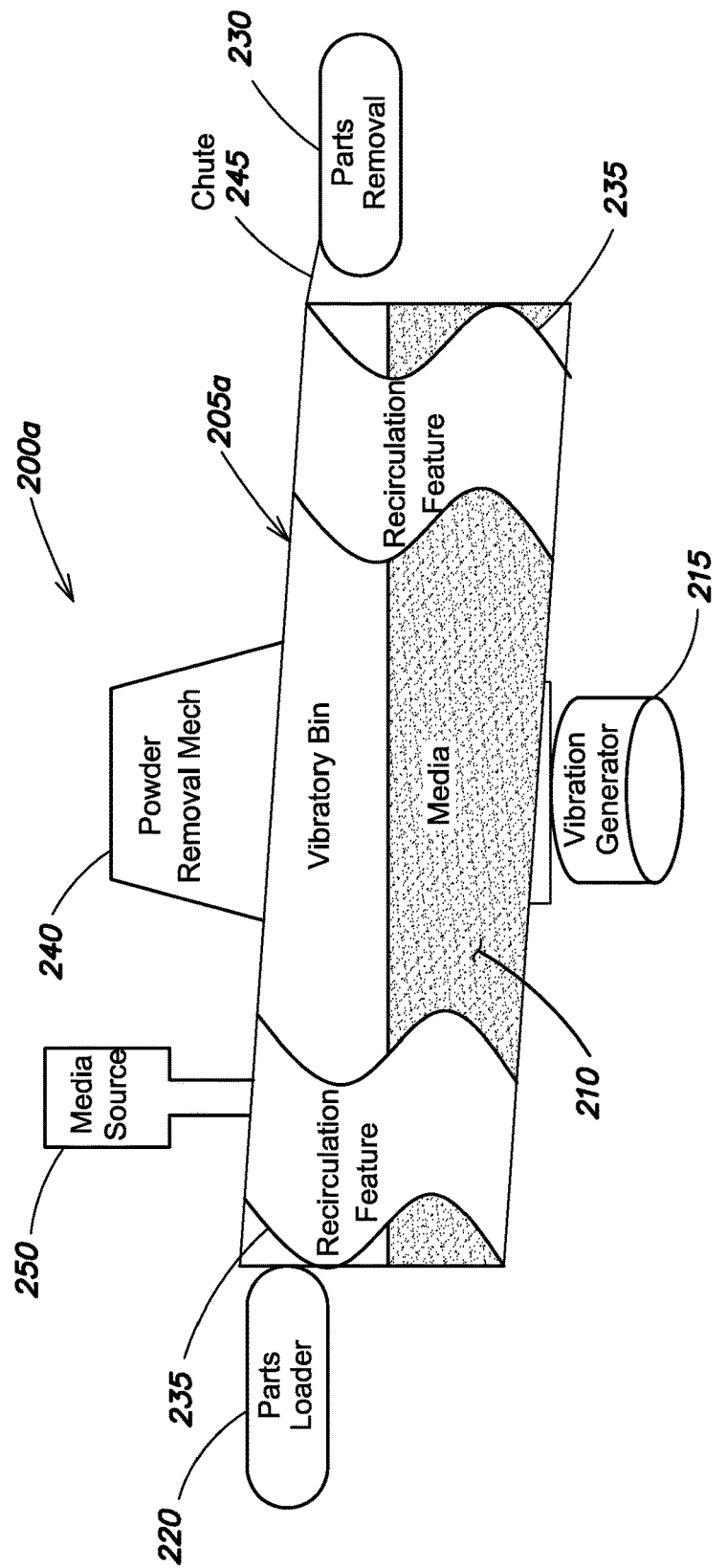
FIG. 13 is a schematic cross-sectional view of another embodiment of a vibratory media cleaning system.

An alternate embodiment of the vibratory media cleaning system 200a may include a bin 205a which is sloped, as illustrated in FIG. 13. The sloped bin 205a may, in some embodiments be axially longer than the non-sloped bin 205 of FIG. 10. Under the influence of vibratory energy from the vibration generator(s) 215 vibratory media 210 and parts being cleaned may travel down the slope of the bin 205a from the automated parts loader 220 to the automated parts removal mechanism 230. Proximate the automated parts removal mechanism 230, vibratory media 210 and cleaned parts may spill over an edge of the bin 205a, pass through an outlet of the bin 205, and/or flow down a chute 245 on to the automated parts removal mechanism 230. Additional vibratory media 210 may be added to the bin 205a from a source of vibratory media 250 as needed to make up for vibratory media 210 which is lost in subsequent processing and not recycled to the bin 205.

Figure 14:
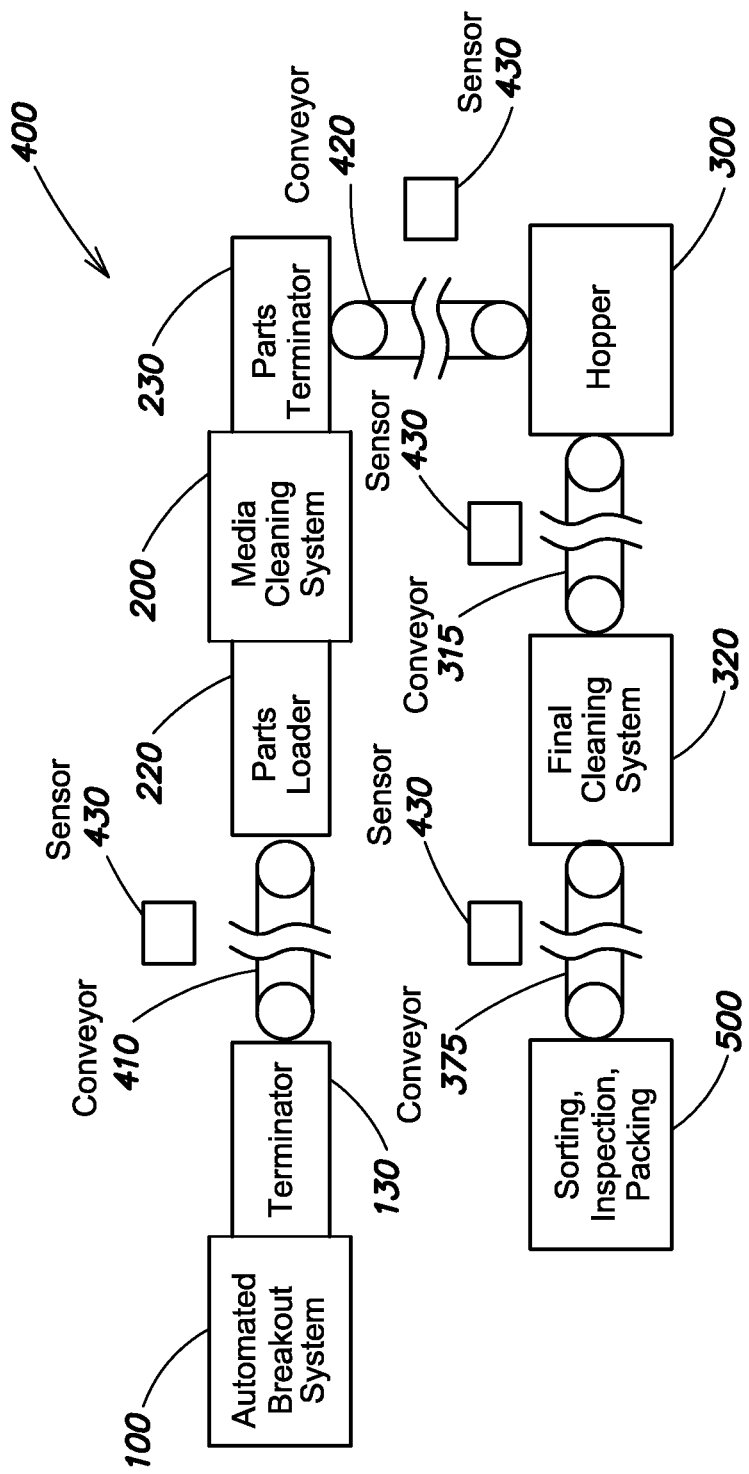
FIG. 14 is a schematic view of a portion of a manufacturing line for 3D printed parts.

In some embodiments, one or more of the automated breakout system 100, vibratory media cleaning system 200, hopper 300, and final clean apparatus 320 may be operatively connected by one or more transport mechanisms, for example, one or more conveyor belts. In some embodiments the automated breakout system 100, vibratory media cleaning system 200, hopper 300, and final clean apparatus 320 may all be operatively connected by one or more transport mechanisms, for example, one or more conveyor belts to form a continuous production system 400. For example, as illustrated in FIG. 14, parts cleaned in the automated breakout system 100 may exit the automated breakout system 100 onto the part terminator 130 and be transferred from the part terminator 130 to the automated parts loader 220 of the vibratory media cleaning system 200 over a conveyor 410. After cleaning in the vibratory media cleaning system 200, parts may be conveyed from the automated parts removal mechanism 230 of the vibratory media cleaning system 200 by a conveyor 420 to the hopper 300 and from the hopper 300 to the final clean apparatus 320 by the ramp or conveyor 315. After exiting the final clean apparatus 320, parts may be transferred to a sorting, inspection, and/or packaging area 500 by the conveyor 375. One or more sensors 430, for example, electric eyes, cameras and/or ultrasonic transducers may be used to monitor the transport of 3D printed parts along any or all of the conveyors of the system. The sensors 430 may be in communication with the computer system 600. The computer system 600 may produce an alarm or alert and/or may automatically halt one or more of the conveyors or any one or more of the automated breakout system 100, vibratory media cleaning system 200, hopper 300, and final clean apparatus 320 responsive to the receipt of data from one or more of the sensors 430 indicative of a fault of a portion of the system, for example, a blockage in the flow of 3D printed parts on one of the conveyors.

Systems and processes described above are merely illustrative embodiments of systems and processes for processing of 3D printed parts. Such illustrative embodiments are not intended to limit the scope of the present disclosure. None of the claims set forth below are intended to be limited to any particular implementation of a process of breakout or cleaning of 3D printed parts, unless such claim includes a limitation explicitly reciting a particular implementation.

Various embodiments disclosed herein may be implemented on one or more computer systems. These computer systems may be, for example, general-purpose computers such as those based on Intel Core-type processors or XEON-type processors, AMD FX-type processors, or any other type of processor. It should be appreciated that one or more of any type of computer system may be used to partially or fully automate processing of 3D printed parts according to various embodiments disclosed herein. Further, software of the system may be located on a single computer or may be distributed among a plurality of computers attached by a communications network.

The computer system may include specially-programmed, special-purpose hardware, for example, an application-specific integrated circuit (ASIC). Aspects and embodiments disclosed herein may be implemented in software, hardware, or firmware, or any combination thereof. Further, such methods, acts, systems, system elements and components thereof may be implemented as part of the computer system described above or as an independent component.

It should be appreciated that the aspects and embodiments disclosed herein are not limited to executing on any particular system or group of systems. Also, it should be appreciated that the invention is not limited to any particular distributed architecture, network, or communication protocol.

Various aspects and embodiments disclosed herein may be programmed using an object-oriented programming language, such as Java, C++, or C# (C-Sharp). Other object-oriented programming languages may also be used. Alternatively, functional, scripting, and/or logical programming languages may be used. Various aspects and embodiments disclosed herein may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

Further, on each of the one or more systems that include one or more components of a system for processing of 3D printed parts, each of the components may reside in one or more locations on the system. For example, different portions of the components of a system for processing of 3D printed parts may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

Figure 15:
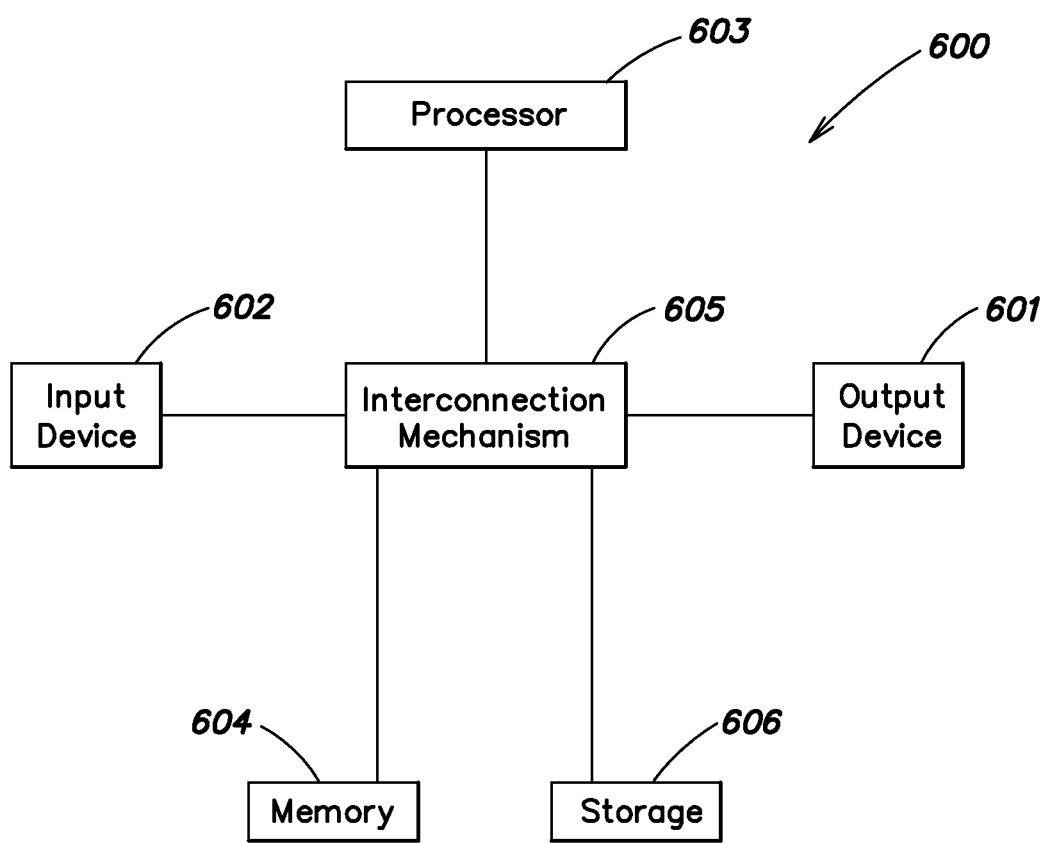
FIG. 15 is a schematic diagram of a computer system which may be utilized in various embodiments disclosed herein.

Various aspects and embodiments disclosed herein may be implemented as specialized software executing in a general-purpose computer system 600 such as that shown in FIG. 15. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and/or one or more cameras 185 and/or electric eyes 190 and/or weight sensors 195 and/or ultrasonic transducers and/or sensors 430 used in monitoring aspects of the 3D printed part processing systems and methods disclosed herein.

Computer system 600 also includes one or more output devices 601, for example, a printing device, display screen, and/or speaker. Computer system 600 may contain one or more interfaces (not shown) that connect computer system 600 to a communication network (in addition or as an alternative to the interconnection mechanism 605. Computer system 600 may be in communication with and capable of controlling various elements of the systems disclosed herein, for example, the tray input mechanism 110, vibration generator(s) 135, and/or the part terminator 130 of embodiments of the automated breakout system 100, the automated parts loader 220, vibration generator(s) 215, recirculation features 235, powder removal mechanism 240, and/or the automated parts removal mechanism 230 of embodiments of the vibratory media cleaning system 200, any of the features of the hopper 300, final clean apparatus 320, and/or the vibratory grading machine 340, and/or any of the transport mechanisms or conveyors between any of the subsystems described herein.

Figure 16:
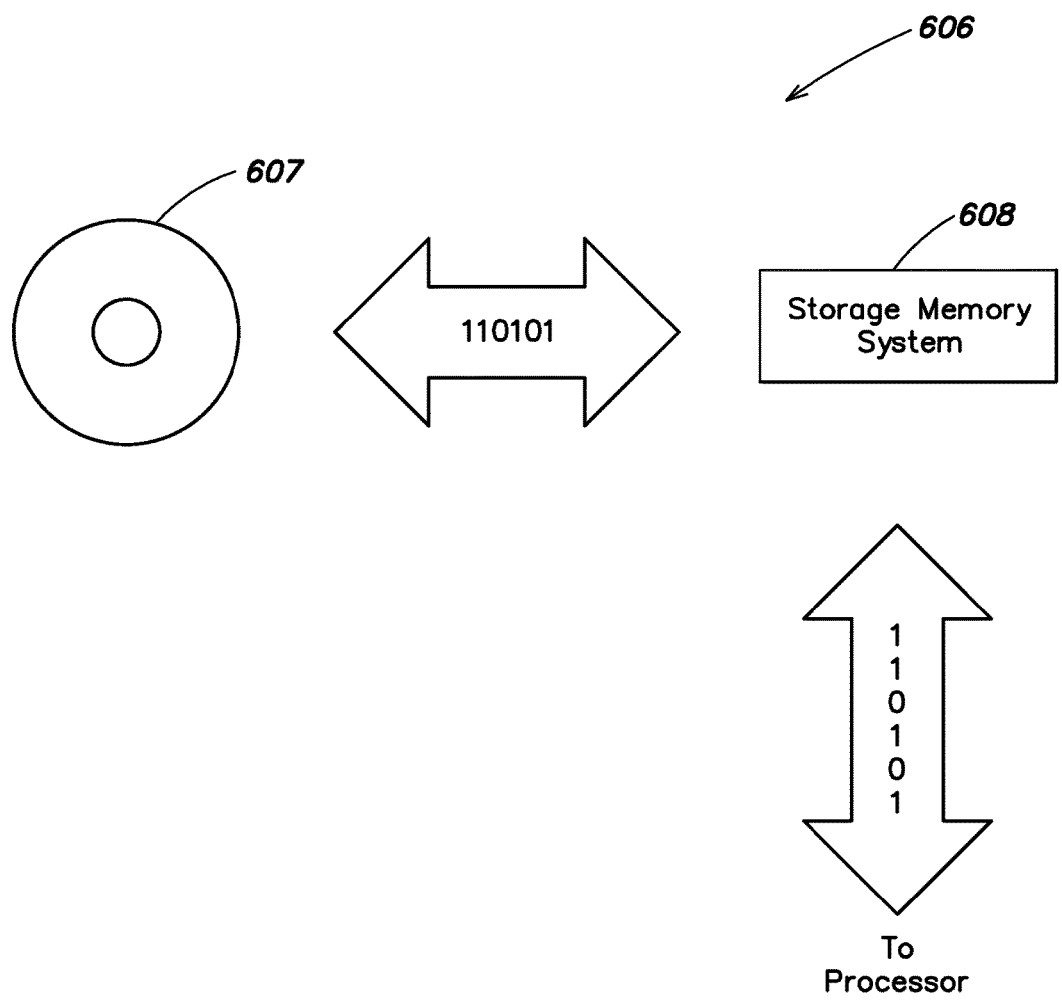
FIG. 16 is a schematic diagram of an embodiment of a storage system for the computer system of FIG. 15.

The storage system 606, shown in greater detail in FIG. 16, typically includes a computer readable and writeable nonvolatile recording medium 607 in which signals are stored that define a program to be executed by the processor or information stored on or in the medium 607 to be processed by the program. The medium may, for example, be a disk or flash memory. Typically, in operation, the processor causes data to be read from the nonvolatile recording medium 607 into another memory 608 that allows for faster access to the information by the processor than does the medium 607. This memory 608 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 608 and then copies the data to the medium 607 after processing is completed. A variety of mechanisms are known for managing data movement between the medium 607 and the integrated circuit memory element 604, 608, and aspects and embodiments disclosed herein are not limited thereto. Aspects and embodiments disclosed herein are not limited to a particular memory system 604 or storage system 606.

Although computer system 600 is shown by way of example as one type of computer system upon which various aspects of the aspects and embodiments disclosed herein may be practiced, it should be appreciated that aspects and embodiments disclosed herein are not limited to being implemented on the computer system as shown in FIG. 15. Various aspects and embodiments disclosed herein may be practiced on one or more computers having a different architecture or components that that shown in FIG. 15.

Computer system 600 may be a general-purpose computer system that is programmable using a high-level computer programming language. Computer system 600 may be also implemented using specially programmed, special purpose hardware. In computer system 600, processor 603 is typically a commercially available processor such as the well-known Pentium class processor available from the Intel Corporation. Many other processors are available. Such a processor usually executes an operating system which may be, for example, the Windows 7 or Windows 8 operating systems available from the Microsoft Corporation, MAC OS Snow Leopard, MAC OS Snow Lion operating systems available from Apple Computer, or UNIX available from various sources. Many other operating systems may be used.

The processor and operating system together define a computer platform for which application programs in high-level programming languages are written. It should be understood that aspects and embodiments disclosed herein are not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects and embodiments disclosed herein may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that aspects and embodiments disclosed herein are not limited to executing on any particular system or group of systems. Also, it should be appreciated that aspects and embodiments disclosed herein are not limited to any particular distributed architecture, network, or communication protocol.

Processes associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, C, C#, or C++, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of this disclosure. It should be understood that any portion of any embodiment disclosed herein may be included in any other embodiment or substituted for any other portion of any other embodiment. Accordingly, the foregoing description and drawings are by way of example only, and the scope of the aspects and embodiments disclosed herein should be determined from proper construction of the appended claims, and their equivalents.

What is claimed is:

1. A system comprising:
an automated breakout system for separating 3D printed parts from printing media, comprising:
a tray input mechanism;
a part terminator;
a bed including a first end coupled to the tray input mechanism and a second end coupled to the part terminator, the bed including one or more passageways configured to pass printing media through the bed, wherein the bed is substantially flat and horizontal, wherein the first end coupled to the tray input mechanism is substantially flat and horizontal; and
a vibration generator coupled to the bed and configured to vibrate the bed;
at least one sensor configured to monitor the automated breakout system at least in part by monitoring a number of parts passing along the bed; and
a control computer configured to:
determine, using data collected by the at least one sensor, the number of parts passing along the bed;
determine, based on the determined number of parts passing along the bed, whether operation of one or more parts of the automated breakout system is to be stopped; and
control the automated breakout system to stop operation of the one or more parts of the automated breakout system responsive to determining that the operation of the one or more parts of the automated breakout system is to be stopped.

2. The system of claim 1, wherein the bed is positioned to form a a downward slope between the tray input mechanism and the part terminator.

3. The system of claim 1, wherein the one or more passageways include perforations passing through the bed.

4. The system of claim 1, wherein the automated breakout system further comprises a printing media powder collection bin.

5. The system of claim 1, wherein the automated breakout system further comprises a recyclable printing media powder collection bin and a waste printing media powder collection bin.

6. The system of claim 5, wherein the automated breakout system further comprises a first chute configured to direct printing media passing through a portion of the bed proximate the first end into the recyclable printing media powder collection bin and a second chute configured to direct printing media passing through a portion of the bed proximate the second end into the waste printing media powder collection bin.

7. The system of claim 1, wherein the part terminator comprises a conveyor.

8. The system of claim 1, wherein the automated breakout system further comprises sidewalls disposed along sides of the bed.

9. The system of claim 1, wherein a width of the bed varies along a length of the bed from the first end to the second end.

10. The system of claim 1, wherein the bed comprises channels defined in an upper surface of the bed, the channels configured and arranged to direct printing media into the one or more passageways.

11. The system of claim 1, wherein the bed comprises impelling devices configured to move the 3D printed parts along a length of the bed from the first end to the second end.

12. The system of claim 1, wherein the tray input mechanism includes a tray elevator.

13. The system of claim 4, wherein the at least one sensor includes a weight sensor configured to monitor a weight of at least one of a tray in the tray input mechanism, the printing media powder collection bin, or the part terminator.

14. The system of claim 1, wherein the at least one sensor includes a camera.

15. The system of claim 1, wherein the at least one sensor includes an ultrasound sensor.

16. The system of claim 1, wherein determining whether the operation of the one or more parts of the automated breakout system is to be stopped comprises:
detecting a blockage of the 3D printed parts and/or the printing media on the bed; and
determining to stop the operation of the one or more parts responsive to detecting the blockage.

17. The system of claim 1, wherein controlling the automated breakout system to stop the operation of the one or more parts of the automated breakout system comprises terminating introduction of additional parts onto the bed.

18. The system of claim 1, wherein controlling the automated breakout system to stop the operation of the one or more parts of the automated breakout system comprises stopping the vibration generator from vibrating the bed.

19. The system of claim 4 wherein the control computer is further configured to:
determine, using the data collected by the at least one sensor, whether the printing media powder collection bin is full.

20. The system of claim 1, wherein the at least one sensor is configured to monitor a state of one or more trays on the tray input mechanism.

21. A system comprising:
an automated breakout system for separating 3D printed parts from printing media, comprising:
a tray input mechanism;
a part terminator;
a flat horizontal bed including a first flat horizontal end coupled to the tray input mechanism and a second flat horizontal end coupled to the part terminator; and
a vibration generator coupled to the bed and configured to vibrate the bed;
at least one camera configured to monitor the automated breakout system; and
a control computer configured to:
determine, using data collected by the at least one camera, a number of parts passing along the bed;
determine, based on the determined number of parts passing along the bed, a failure in operation of one or more parts of the automated breakout system; and
control the automated breakout system to stop operation of the one or more parts of the automated breakout system, responsive to determining that operation of the one or more parts of the automated breakout system is to be stopped.

22. A system comprising:
a 3D printer;
an automated breakout system for separating 3D printed parts, printed by the 3D printer, from printing media, the automated breakout system comprising:
a tray input mechanism;
a part terminator; and a flat horizontal bed including a first flat end coupled to the tray input mechanism and a second flat end coupled to the part terminator; and at least one sensor configured to monitor the automated breakout system at least in part by monitoring a number of parts passing along the flat horizontal bed; and a control computer configured to:
  determine, using data collected by the at least one sensor, the number of parts passing along the flat horizontal bed;
  determine, based on the determined number of parts passing along the flat horizontal bed, whether operation of one or more parts of the automated breakout system is to be stopped; and
  control the automated breakout system to stop operation of the one or more parts of the automated breakout system responsive to determining that the operation of the one or more parts of the automated breakout system is to be stopped.

\* \* \* \* \*